(12) United States Patent
Ishiguro et al.

(10) Patent No.: US 12,519,308 B2
(45) Date of Patent: Jan. 6, 2026

(54) SEMICONDUCTOR DEVICE

(71) Applicant: Kioxia Corporation, Tokyo (JP)

(72) Inventors: Shigefumi Ishiguro, Yokohama Kanagawa (JP); Yasuhiro Suematsu, Yokohama Kanagawa (JP); Masaru Koyanagi, Ota Tokyo (JP); Maya Inagaki, Yokohama Kanagawa (JP); Kentaro Watanabe, Yokohama Kanagawa (JP); Shoki Ito, Yokohama Kanagawa (JP)

(73) Assignee: KIOXIA CORPORATION, Tokyo (JP)

( * ) Notice: Subject to any disclaimer, the term of this patent is extended or adjusted under 35 U.S.C. 154(b) by 141 days.

(21) Appl. No.: 18/584,301

(22) Filed: Feb. 22, 2024

(65) Prior Publication Data

US 2024/0313527 A1 Sep. 19, 2024

(30) Foreign Application Priority Data

Mar. 17, 2023 (JP) ................................. 2023-043448

(51) Int. Cl.
*H02H 9/04* (2006.01)
(52) U.S. Cl.
CPC .................................. *H02H 9/046* (2013.01)
(58) Field of Classification Search
CPC ..................................................... H02H 9/046
USPC ........................................................ 361/56
See application file for complete search history.

(56) References Cited

U.S. PATENT DOCUMENTS

| | | | | |
|---|---|---|---|---|
| 3,600,610 | A | * 8/1971 | Kelsch | G03B 27/625 355/69 |
| 5,745,323 | A | * 4/1998 | English | H03K 19/00315 361/111 |
| 5,946,177 | A | * 8/1999 | Miller | H10D 89/60 361/56 |
| 9,184,586 | B2 | 11/2015 | Wang et al. | |
| 10,074,643 | B2 * | 9/2018 | Mertens | H03K 19/20 |
| 10,468,403 | B2 | 11/2019 | Fukasaku et al. | |
| 10,826,291 | B2 | 11/2020 | Xavier | |
| 2007/0053120 | A1 * | 3/2007 | Gauthier, Jr. | H02H 9/046 361/56 |
| 2007/0076338 | A1 * | 4/2007 | Traynor | H10D 89/819 361/56 |

(Continued)

FOREIGN PATENT DOCUMENTS

CN 217641333 U * 10/2022 ............. H02H 9/046

*Primary Examiner* — Dharti H Patel
(74) *Attorney, Agent, or Firm* — Foley & Lardner LLP

(57) ABSTRACT

A semiconductor device includes a protection circuit electrically connected to a first interconnection and a second interconnection, a first voltage and a second voltage supplied to the first interconnection and the second interconnection, respectively. The protection circuit includes: a first resistor connected between the first interconnection and a first node; a first capacitor connected between the second interconnection and the first node; a second resistor connected between the second interconnection and a second node located; a second capacitor connected between the second interconnection and the second node, and connected in parallel to the second resistor; a third resistor connected between the first interconnection and a third node; and a third capacitor connected between the second interconnection and the third node.

20 Claims, 18 Drawing Sheets

(56) References Cited

U.S. PATENT DOCUMENTS

| | | |
|---|---|---|
| 2013/0342941 A1 | 12/2013 | Wang et al. |
| 2014/0168831 A1* | 6/2014 | Watanabe .............. H02H 9/046 |
| | | 361/56 |
| 2016/0020606 A1* | 1/2016 | Kato ...................... H03K 19/20 |
| | | 361/56 |
| 2018/0026440 A1* | 1/2018 | Zhao .................... H10D 89/819 |
| | | 361/56 |
| 2018/0374840 A1 | 12/2018 | Fukasaku et al. |
| 2020/0083705 A1* | 3/2020 | Xavier ................... H02H 9/046 |
| 2021/0057908 A1* | 2/2021 | Franck .................. H02H 9/046 |
| 2023/0009631 A1* | 1/2023 | Zhu ....................... H02H 9/046 |
| 2023/0170689 A1* | 6/2023 | Zhu ..................... H10D 89/921 |
| | | 361/56 |
| 2024/0313527 A1* | 9/2024 | Ishiguro ................ H02H 9/046 |
| 2025/0096559 A1* | 3/2025 | Kim .................... H03K 17/6871 |
| 2025/0141221 A1* | 5/2025 | Lee ...................... H10K 59/131 |
| 2025/0246903 A1* | 7/2025 | Hsu ....................... H02H 9/046 |

\* cited by examiner

100

100

100

100

100

R2a,R4a

SEMICONDUCTOR DEVICE

CROSS-REFERENCE TO RELATED APPLICATION

This application is based upon and claims the benefit of priority from Japanese Patent Application No. 2023-043448, filed Mar. 17, 2023, the entire contents of which are incorporated herein by reference.

FIELD

Embodiments described herein relate generally to a semiconductor device.

BACKGROUND

In a semiconductor device provided with an ESD (electrostatic discharge) protection circuit which protects a circuit to be protected from static electricity, it is desirable to appropriately discharge surge charges in the ESD protection circuit. Furthermore, it is desirable to prevent a through current in the ESD protection circuit which may occur upon power-on.

DETAILED DESCRIPTION

Figure 1:
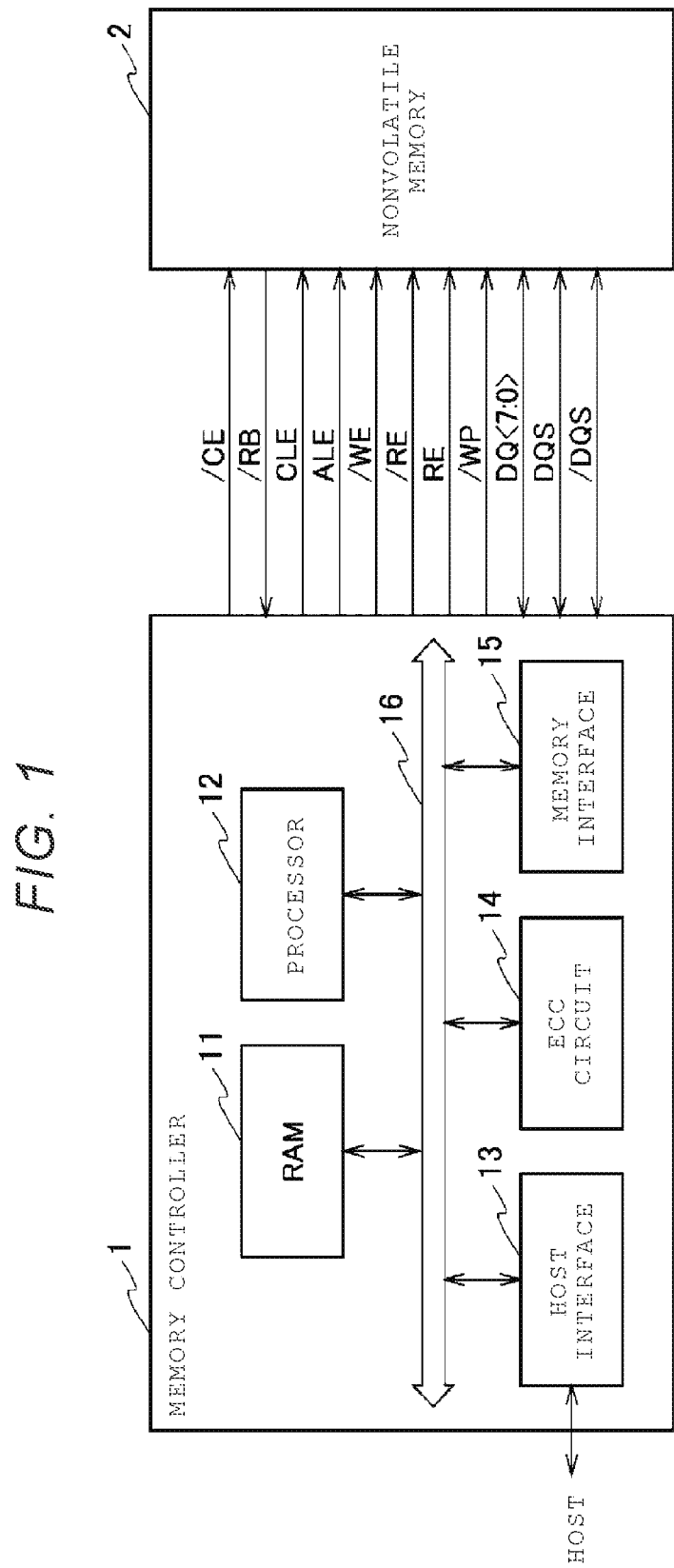
FIG. 1 is a block diagram showing a configuration example of a memory system according to the present embodiment.

Embodiments provide a semiconductor device capable of appropriately discharging surge charges in a protection circuit protecting a circuit to be protected and preventing a through current in the protection circuit.

In general, according one to embodiment, a semiconductor device includes a protection circuit electrically connected to a first interconnection and a second interconnection, a first voltage and a second voltage supplied to the first interconnection and the second interconnection, respectively. The protection circuit includes: a first resistor connected between the first interconnection and a first node; a first capacitor connected between the second interconnection and the first node; a second resistor connected between the second interconnection and a second node located; a second capacitor connected between the second interconnection and the second node, and connected in parallel to the second resistor; a third resistor connected between the first interconnection and a third node; and a third capacitor connected between the second interconnection and the third node.

Hereinafter, an embodiment according to the present disclosure will be described with reference to the drawings. The present embodiment does not limit the present disclosure. The drawings are schematic or conceptual, and the proportions of respective parts are not necessarily the same as in reality. In the specification and drawings, the same elements as those previously described in relation with the aforementioned drawings are denoted by the same reference numerals, and detailed description thereof will be appropriately omitted.

First Configuration Example: Nonvolatile Memory

[Configuration of Memory System]

FIG. 1 is a block diagram showing a configuration example of a memory system according to the present embodiment. The memory system according to the present embodiment includes a memory controller 1 and a NAND type nonvolatile memory 2. A NAND type nonvolatile memory is also simply referred to as a nonvolatile memory. The memory system may be connected to a host (not shown). For example, the host is an electronic device such as a personal computer and a mobile terminal.

The nonvolatile memory 2 is a semiconductor memory device which stores data in a nonvolatile manner. As shown in FIG. 1, the memory controller 1 and each nonvolatile memory 2 are connected via a NAND bus. The memory controller 1 controls writing of data to the nonvolatile memory 2 according to a write request from the host. In addition, the memory controller 1 controls reading of data from the nonvolatile memory 2 according to a read request from the host. The memory controller 1 includes a random access memory (RAM) 11, a processor 12, a host interface circuit 13, an error check and correct (ECC) circuit 14 and a memory interface circuit 15. The RAM 11, the processor 12, the host interface circuit 13, the ECC circuit 14 and the memory interface circuit 15 are connected to each other by an internal bus 16.

The host interface circuit 13 outputs, to the internal bus 16, a request received from the host, write data being user data, and the like. The host interface circuit 13 transmits, to the host, user data read from the nonvolatile memory 2, a response from the processor 12, and the like.

The memory interface circuit 15 controls the process of writing user data and the like to the nonvolatile memory 2 and the process of reading user data and the like from the nonvolatile memory 2, based on an instruction of the processor 12.

The processor 12 generally controls the memory controller 1. For example, the processor 12 is a central processing unit (CPU), a micro processing unit (MPU), or the like. When receiving a request via the host interface circuit 13 from the host, the processor 12 performs control according to the request. For example, according to a request from the host, the processor 12 instructs the memory interface circuit 15 to write user data and parity to the nonvolatile memory 2. According to a request from the host, the processor 12 instructs the memory interface circuit 15 to read user data and parity from the nonvolatile memory 2.

The processor 12 determines a storage region (hereinafter, referred to as a memory region) on the nonvolatile memory 2 for user data stored in the RAM 11. The user data is stored in the RAM 11 via the internal bus 16. The processor 12 executes determination of a memory region for data of a page unit being a write unit, that is, page data. In the present specification, user data stored in one page of the nonvolatile memory 2 is defined as unit data. For example, the unit data is encoded and stored in the nonvolatile memory 2 as a code word.

The ECC circuit 14 encodes the user data stored in the RAM 11 and generates a code word. The ECC circuit 14 decodes a code word read from the nonvolatile memory 2.

Encoding is not essential. Although the memory controller 1 may store unit data in the nonvolatile memory 2 without encoding, FIG. 1 shows, as one configuration example, a configuration in which encoding is performed. When the memory controller 1 does not perform encoding, page data corresponds to unit data. One code word may be generated based on one unit data, or one code word may be generated based on divided data obtained by dividing unit data. Furthermore, one code word may be generated using a plurality of pieces of unit data.

The processor 12 determines a memory region of the nonvolatile memory 2 serving as a write destination for each unit data. A physical address is assigned to a memory region of the nonvolatile memory 2. The processor 12 manages the memory region serving as a write destination of unit data using a physical address. By designating the physical address of the determined memory region, the processor 12 instructs the memory interface circuit 15 to write user data to the nonvolatile memory 2. The processor 12 manages the correspondence between the logical address (the logical address managed by the host) and the physical address of user data. When receiving a read request including a logical address from the host, the processor 12 specifies a physical address corresponding to the logical address, and by designating the physical address, instructs the memory interface circuit 15 to read the user data.

The RAM 11 temporarily stores user data received from the host before storing the user data in the nonvolatile memory 2, or temporarily stores the data read from the nonvolatile memory 2 before transmitting the data to the host. For example, the RAM 11 is a general-purpose memory such as a static random access memory (SRAM) and a dynamic random access memory (DRAM).

FIG. 1 shows a configuration example in which the memory controller 1 includes the ECC circuit 14 and the memory interface circuit 15, respectively. However, the ECC circuit 14 may be built in the memory interface circuit 15. Furthermore, the ECC circuit 14 may be built in the nonvolatile memory 2.

When receiving a write request from the host, the memory controller 1 operates as follows. The processor 12 temporarily stores write data in the RAM 11. The processor 12 reads the data stored in the RAM 11 and inputs the read data to the ECC circuit 14. The ECC circuit 14 encodes the input data, and provides a code word to the memory interface circuit 15. The memory interface circuit 15 writes the input code word to the nonvolatile memory 2.

When receiving a read request from the host, the memory controller 1 operates as follows. The memory interface circuit 15 provides a code word read from the nonvolatile memory 2 to the ECC circuit 14. The ECC circuit 14 decodes the input code word, and stores the decoded data in the RAM 11. The processor 12 transmits the data stored in the RAM 11 to the host via the host interface circuit 13.

The processor 12 of the memory controller 1 controls the memory interface circuit 15 to transmit signals DQ<7:0> and data strobe signals DOS and /DQS to the nonvolatile memory 2. The signals DQ<7:0>transmitted from the memory controller 1 to the nonvolatile memory 2 include a command, an address and data. The data strobe signals DOS and /DQS are synchronization control signals which indicate read and write timings that occur in synchronization with data transfer.

The processor 12 controls the memory interface circuit 15 to transmit a chip enable signal /CE, a signal CLE, a signal ALE, a signal /WE, read enable signals RE and /RE and a write protect signal /WP to the nonvolatile memory 2. The signal /CE is a signal for putting each nonvolatile memory 2 into an operating state. The write enable signal /WE is a signal which permits writing, and the nonvolatile memory 2 fetches a command and an address by receiving this signal /WE. That is, the signal /WE may be called a fetch signal. The command latch enable signal CLE is a signal which permits command latching, and the address latch enable signal ALE is a signal which permits address latching.

A signal with the symbol "/" at the beginning indicates active low or negative logic. In other words, a signal without the symbol "/" at the beginning get active when the signal is at an "H" level, whereas a signal with the symbol "/" at the beginning get active when the signal is at an "L" level.

On the other hand, the nonvolatile memory 2 receives various signals from the memory controller 1, and transmits the signals DQ<7:0> and the data strobe signals DOS and /DQS to the memory controller 1. The nonvolatile memory 2 transmits a signal /RB to the memory controller 1. The ready-busy signal /RB indicates whether it is a ready state in which it is possible to receive a command from the outside or a busy state in which it is not possible to receive a command from the outside.

[Configuration of Nonvolatile Memory]

Figure 2:
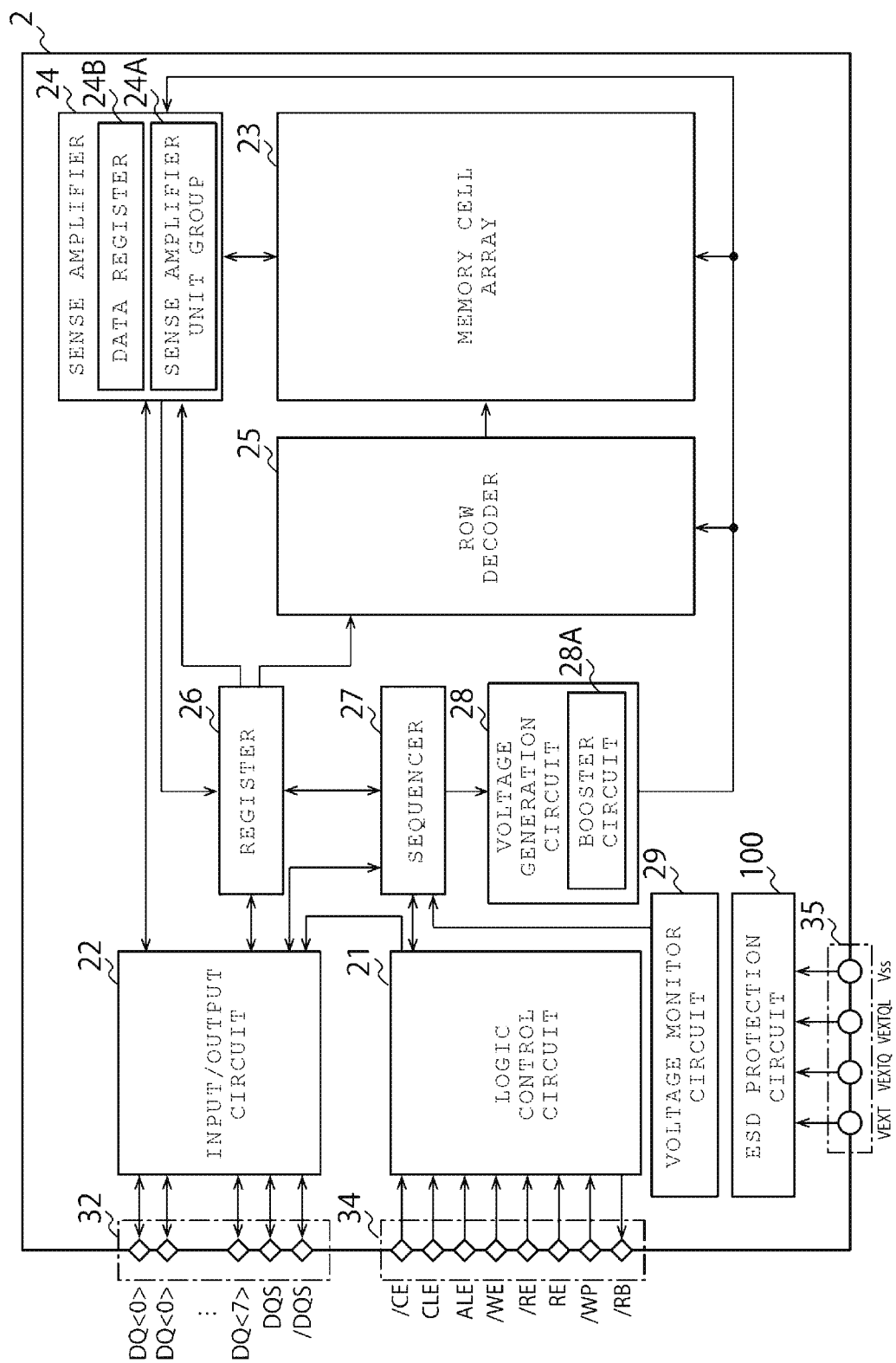
FIG. 2 is a block diagram showing a configuration example of a nonvolatile memory according to the present embodiment.

FIG. 2 is a block diagram showing a configuration example of a nonvolatile memory according to the present embodiment. The nonvolatile memory 2 includes a logic control circuit 21, an input/output circuit 22, a memory cell array 23, a sense amplifier 24, a row decoder 25, a register 26, a sequencer 27, a voltage generation circuit 28, a voltage monitor circuit 29, an input/output pad group 32, a logic control pad group 34, a power input terminal group 35, and an ESD protection circuit 100.

The memory cell array 23 includes a plurality of blocks. Each of the plurality of blocks BLK includes a plurality of memory cell transistors (memory cells). In the memory cell array 23, in order to control voltages to be applied to the memory cell transistors, a plurality of bit lines, a plurality of word lines, a source line, and the like are disposed.

Since the input/output pad group 32 performs transmission and reception of respective signals including data to and from the memory controller 1, the input/output pad group 32 includes a plurality of terminals (pads) which correspond to the signals DQ<7:0> and the data strobe signals DOS and /DQS.

Since the logic control pad group 34 performs transmission and reception of respective signals to and from the memory controller 1, the logic control pad group 34 includes a plurality of terminals (pads) which correspond to the chip enable signal /CE, the command latch enable signal CLE, the address latch enable signal ALE, the write enable signal /WE, the read enable signals RE and /RE, the write protect signal /WP and the ready-busy signal /RB.

The chip enable signal /CE enables selection of the nonvolatile memory 2. The command latch enable signal CLE enables commands transmitted as the signals DQ<7:0> to be latched in a command register. The address latch enable signal ALE enables addresses transmitted as the signals DQ<7:0> to be latched into an address register. The write enable signal /WE enables writing. The read enable signal RE enables reading. The write protect signal /WP prohibits writing and erasing. The ready-busy signal /RB indicates whether the nonvolatile memory 2 is in a ready state (a state in which it is possible to receive a command from the outside) or in a busy state (a state in which it is not possible to receive a command from the outside). By receiving the ready-busy signal /RB, the memory controller 1 may be aware of the state of the nonvolatile memory 2.

The power input terminal group 35 includes a plurality of terminals which input power supply voltages VEXT, VEXTQ and VEXTQL and a ground voltage Vss to supply various operating power to the nonvolatile memory 2 from the outside. The ESD protection circuit 100 shown in FIG. 2 is actually connected between power sources (VEXTQL and Vss, VEXT and Vss and VEXTQ and Vss) (see FIGS. 3 to 5). The power input terminal group 35 may include a plurality of terminals which input a power supply voltage Vpp, in addition to the plurality of terminals which input the power supply voltages VEXT, VEXTQ and VEXTQL and the ground voltage Vss. The power supply voltage VEXT is a circuit power supply voltage applied generally from the outside as operating power, and for example, a voltage of about 2.5 V or 3.3 V is input. In general, in a specification, a data sheet, and the like, a range of the voltage value of the voltage VEXT at which a nonvolatile memory operates normally is determined, and is, for example, a range of 2.35 V to 3.6 V. As the power supply voltage VEXTQ, for example, a voltage of 1.2 V or 1.8 V is input. The power supply voltage VEXTQ is used when transmitting and receiving signals between the memory controller 1 and the nonvolatile memory 2. The power supply voltage VEXT is also a power supply voltage Vcc. The power supply voltage VEXTQ is also a power supply voltage VccQ.

The power supply voltage Vpp is a power supply voltage higher than the power supply voltage VEXT, and for example, a voltage of 12 V is input. When writing data to or erasing data from the memory cell array 23, a high voltage of about 20 V is required. At this time, by boosting the power supply voltage Vpp of about 12 V rather than boosting the power supply voltage VEXT of about 3.3 V by the booster circuit of the voltage generation circuit 28, it is possible to generate a desired voltage at high speed and with low power consumption. The power supply voltage VEXT is power that is standardly supplied to the nonvolatile memory 2, and the power supply voltage Vpp is power that is additionally and optionally supplied depending on a usage environment, for example.

The logic control circuit 21 and the input/output circuit 22 are connected to the memory controller 1 via the NAND bus. The input/output circuit 22 transmits and receives signals DQ (for example, the signals DQ0 to DQ7) to and from the memory controller 1 via the NAND bus.

The logic control circuit 21 receives external control signals (e.g., the chip enable signal /CE, the command latch enable signal CLE, the address latch enable signal ALE, the write enable signal /WE, the read enable signals RE and /RE and the write protect signal /WP) from the memory controller 1 via the NAND bus. The logic control circuit 21 transmits the ready-busy signal /RB to the memory controller 1 via the NAND bus.

The input/output circuit 22 transmits and receives the signals DQ<7:0> and the data strobe signals DOS and /DQS to and from the memory controller 1. The input/output circuit 22 transfers the command and address in the signals DQ<7:0> to the register 26. The input/output circuit 22 transmits and receives write data and read data to and from the sense amplifier 24.

The register 26 includes a command register, an address register, a status register, and the like. The command register temporarily stores a command. The address register temporarily stores an address. The status register temporarily stores data necessary for the operation of the nonvolatile memory 2. The register 26 is configured with, for example, an SRAM.

The sequencer 27 as a control circuit receives a command from the register 26, and controls the nonvolatile memory 2 according to a sequence based on the command.

The voltage generation circuit 28 includes a booster circuit 28A. The booster circuit 28A receives a power supply voltage from outside the nonvolatile memory 2, boosts the power supply voltage, and generates a plurality of voltages used in a write operation, a read operation, an erasing operation, and the like. The voltage generation circuit 28 supplies the voltages generated by the booster circuit 28A to the memory cell array 23, the sense amplifier 24, the row decoder 25, and the like.

The voltage monitor circuit 29 measures the voltage values of the voltages VEXT, VEXTQ and VEXTQL supplied from the outside, and outputs voltage value information of the voltages VEXT, VEXTQ and VEXTQL to the sequencer 27. The frequency of measuring voltage values depends on a memory system, and is freely selected. The frequency of measuring voltage values is, for example, when performing each of a write operation, a read operation, an erasing operation and the like or each power-on in which power is input. Furthermore, voltage values may be measured at regular intervals of, for example, 1 to several tens or hundreds of seconds, msec, usec, or the like.

The row decoder 25 receives a row address from the register 26, and decodes the row address. The row decoder 25 performs a word line selection operation based on the decoded row address. Then, the row decoder 25 transfers a plurality of voltages necessary for a write operation, a read operation and an erasing operation to a selected block.

The sense amplifier 24 receives a column address from the register 26, and decodes the column address. The sense amplifier 24 has a sense amplifier unit group 24A and a data register 24B. The sense amplifier unit group 24A is connected to each bit line, and selects any one bit line based on the decoded column address. When reading data, the sense amplifier unit group 24A senses and amplifies data read from a memory cell transistor to a bit line. When writing data, the sense amplifier unit group 24A transfers write data to a bit line.

When reading data, the data register 24B temporarily stores data detected by the sense amplifier unit group 24A, and serially transfers the data to the input/output circuit 22. When writing data, the data register 24B temporarily stores data serially transferred from the input/output circuit 22, and transfers the data to the sense amplifier unit group 24A. The data register 24B is configured with an SRAM or the like.

[Connection of ESD Protection Circuit]

Figure 3:
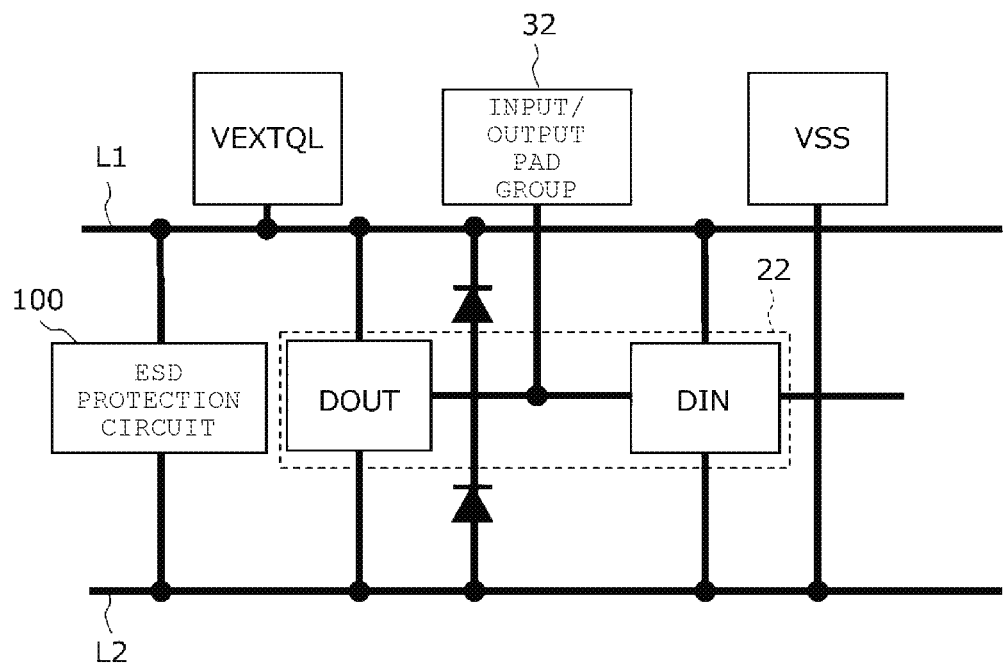
FIG. 3 is a circuit diagram showing an example of a configuration of an ESD protection circuit and its surroundings according to the present embodiment.

FIG. 3 is a circuit diagram showing an example of the configuration of the ESD protection circuit 100 and its surroundings according to the present embodiment. FIG. 3 shows the ESD protection circuit 100 which is connected between VEXTQL and Vss power sources.

The ESD protection circuit 100 is connected between an interconnection L1 and an interconnection L2. The interconnections L1 and L2 shown in FIG. 3 correspond to interconnections L1 and L2 which will be described later with reference to FIG. 6. The interconnection L1 is electrically connected to the power source which supplies the voltage VEXTQL. The interconnection L2 is electrically connected to the power source which supplies the voltage VSS.

The input/output circuit 22 is connected between the interconnection L1 and the interconnection L2. The ESD protection circuit 100 and the input/output circuit 22 are connected in parallel to each other.

Figure 4:
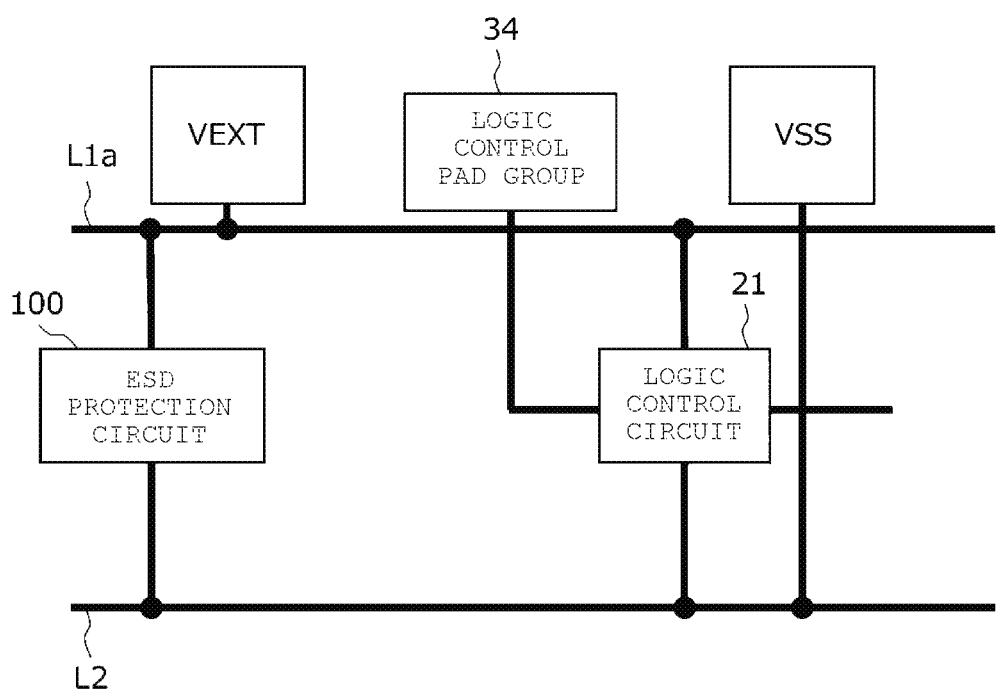
FIG. 4 is a circuit diagram showing an example of the configuration of the ESD protection circuit and its surroundings according to the present embodiment.

FIG. 4 is a circuit diagram showing an example of the configuration of the ESD protection circuit 100 and its surroundings according to the present embodiment. FIG. 4 shows the ESD protection circuit 100 which is connected between VEXT and Vss power sources.

The ESD protection circuit 100 is connected between an interconnection L1a and the interconnection L2. The interconnection L2 shown in FIG. 4 corresponds to the interconnection L2 which will be described later with reference to FIG. 6, and is the same as the interconnection L2 shown in FIG. 3. On the other hand, the interconnection L1a shown in FIG. 4 is electrically connected to the power source which supplies the voltage VEXT. Accordingly, when the ESD protection circuit 100 is connected between the VEXT and Vss power sources, the interconnection L1a is electrically connected to the ESD protection circuit 100 instead of the interconnection L1.

The logic control circuit 21 is connected between the interconnection L1a and the interconnection L2. The ESD protection circuit 100 and the logic control circuit 21 are connected in parallel to each other.

Figure 5:
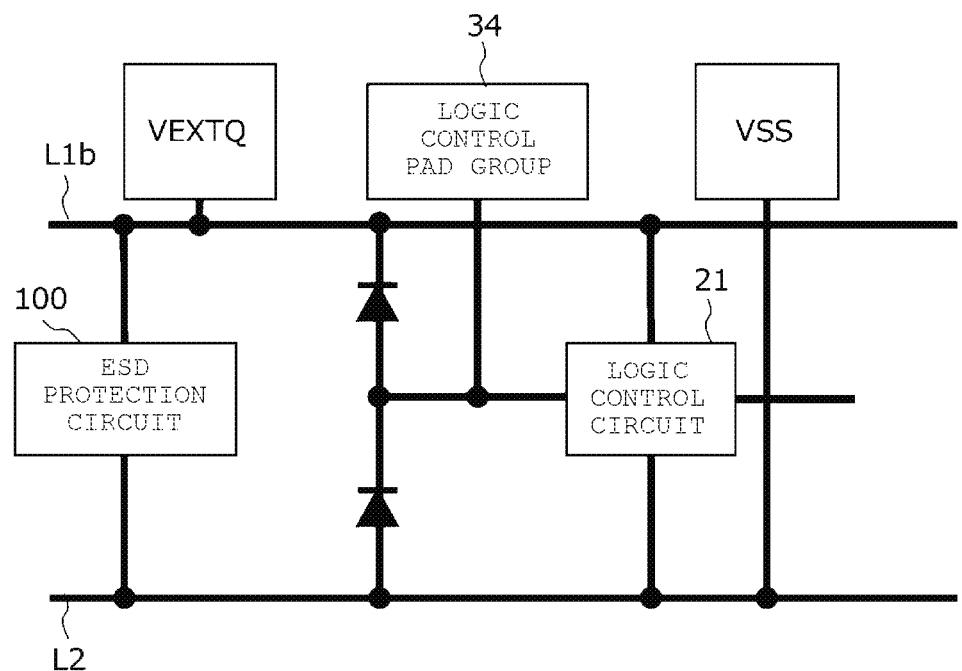
FIG. 5 is a circuit diagram showing an example of the configuration of the ESD protection circuit and its surroundings according to the present embodiment.

FIG. 5 is a circuit diagram showing an example of the configuration of the ESD protection circuit 100 and its surroundings according to the present embodiment. FIG. 5 shows the ESD protection circuit 100 which is connected between VEXTQ and Vss power sources.

The ESD protection circuit 100 is connected between an interconnection L1b and the interconnection L2. The interconnection L2 shown in FIG. 5 corresponds to the interconnection L2 which will be described later with reference to FIG. 6, and is the same as the interconnection L2 shown in FIGS. 3 and 4. On the other hand, the interconnection L1b shown in FIG. 5 is electrically connected to the power source which supplies the voltage VEXTQ. Accordingly, when the ESD protection circuit 100 is connected between the VEXTQ and Vss power sources, the interconnection L1b is electrically connected to the ESD protection circuit 100 instead of the interconnection L1.

The logic control circuit 21 is connected between the interconnection L1b and the interconnection L2. The ESD protection circuit 100 and the logic control circuit 21 are connected in parallel to each other.

First Embodiment

Figure 6:
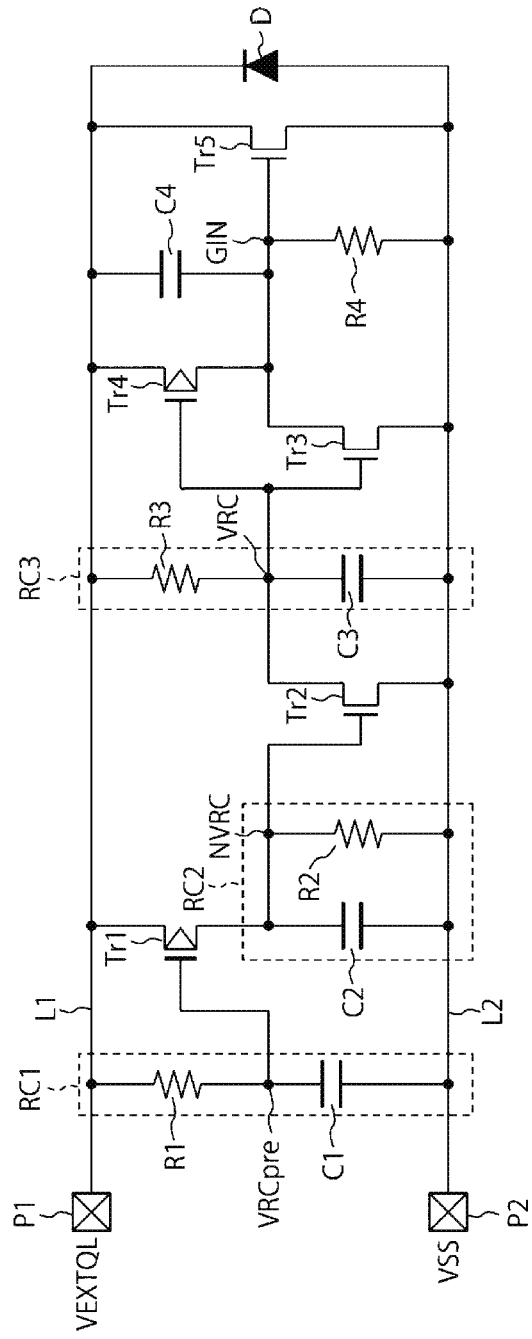
FIG. 6 is a circuit diagram showing an example of the configuration of an ESD protection circuit according to a first embodiment.

FIG. 6 is a circuit diagram showing an example of the configuration of the ESD protection circuit 100 according to a first embodiment.

The ESD protection circuit 100 according to the present embodiment is provided in a semiconductor device, and can protect a circuit to be protected in the semiconductor device from static electricity. The semiconductor device includes, for example, each component in the nonvolatile memory 2, as a circuit to be protected. The ESD protection circuit 100 according to the present embodiment is configured with an RCTMOS circuit.

The semiconductor device includes pads P1 and P2 to which power supply voltages are supplied and interconnections L1 and L2. The pad P1 is, for example, an external connection pad to which the voltage VEXTQL is supplied. The pad P2 is, for example, an external connection pad to which the voltage VSS is supplied. The interconnection L1 is a power interconnection to which the voltage VEXTQL is supplied from the pad P1. The interconnection L2 is a power interconnection to which the voltage VSS is supplied from the pad P2. The ESD protection circuit 100 according to the present embodiment is electrically connected to the interconnections L1 and L2, and the circuit to be protected according to the present embodiment is electrically connected to the interconnections L1 and L2 downstream of the ESD protection circuit 100. The voltage VEXTQL is an example of a first voltage, and the voltage VSS is an example of a second voltage. The first voltage is higher than the second voltage. The voltage VEXTQ may be supplied to the pad P1. In this case, the voltage VEXTQ is an example of the first voltage (see FIG. 5). The interconnection L1 is an example of a first interconnection, and the interconnection L2 is an example of a second interconnection.

In order to save power, a low voltage power source may be adopted. In this case, a voltage supplied to the pad P1 is relatively low. The voltage VEXTQL is the power supply voltage of the low voltage power source. The voltage VEXTQL is lower than the voltage VEXTQ which is, for example, 1.2 V. The voltage VEXTQL is, for example, 0.6 V. The voltage VEXTQ may be, for example, 0.6 V to 1.2 V.

The ESD protection circuit 100 according to the present embodiment includes a first RC circuit RC1, a transistor Tr1, a second RC circuit RC2, a transistor Tr2, a third RC circuit RC3, a transistor Tr3, a transistor Tr4, a capacitor C4, a resistor R4, a transistor Tr5 and a diode D.

The first RC circuit RC1 has a resistor R1 and a capacitor C1. The resistor R1 is connected between the interconnection L1 and a node VRCpre. The capacitor C1 is connected between the interconnection L2 and the node VRCpre.

The transistor Tr1 is connected between the interconnection L1 and a node NVRC. The node NVRC is located downstream of the node VRCpre. The gate of the transistor Tr1 is electrically connected to the node VRCpre. The transistor Tr1 is, for example, a p-type MOSFET.

The second RC circuit RC2 has a resistor R2 and a capacitor C2. The resistor R2 is connected between the interconnection L2 and the node NVRC. The capacitor C2 is connected between the interconnection L2 and the node NVRC. The resistor R2 and the capacitor C2 are connected in parallel to each other.

The transistor Tr2 is connected between the interconnection L2 and a node VRC. The node VRC is located downstream of the node NVRC. The gate of the transistor Tr2 is electrically connected to the node NVRC. The transistor Tr2 is, for example, an n-type MOSFET.

The third RC circuit RC3 has a resistor R3 and a capacitor C3. The resistor R3 is connected between the interconnection L1 and the node VRC. The capacitor C3 is connected between the interconnection L2 and the node VRC.

The transistor Tr3 is connected between the interconnection L2 and a node GIN. The node GIN is located downstream of the node VRC. The gate of the transistor Tr3 is electrically connected to the node VRC. The transistor Tr3 is, for example, an n-type MOSFET.

The transistor Tr4 is connected between the interconnection L1 and the node GIN. The gate of the transistor Tr4 is electrically connected to the node VRC. The transistor Tr4 is, for example, a p-type MOSFET.

The capacitor C4 is connected between the interconnection L1 and the node GIN.

The resistor R4 is connected between the interconnection L2 and the node GIN.

The transistor Tr5 is connected between the interconnection L1 and the interconnection L2. The gate of the transistor Tr5 is electrically connected to the node GIN. The transistor Tr5 is, for example, an n-type MOSFET.

The cathode of the diode D is electrically connected to the interconnection L1. The anode of the diode D is electrically connected to the interconnection L2. The diode D may be, for example, a parasitic diode of the transistor Tr5.

Next, the functions of the respective components of the ESD protection circuit 100 will be described.

Hereinafter, the functions of the respective components of the ESD protection circuit 100 during an ESD test of the nonvolatile memory 2, and when the nonvolatile memory 2 is powered on and during a normal operation of the nonvolatile memory 2. During the ESD test, it is necessary to turn on the transistor Tr5 to discharge charges. Upon power-on, it is necessary to turn off the transistor Tr5 to prevent a through current.

The first RC circuit RC1 is a circuit which controls the charging time of the node NVRC during the ESD test. The charging time of the node NVRC is a time required to charge the voltage of the node NVRC to the voltage VEXTQL.

The transistor Tr1 is a transistor which charges the voltage of the node NVRC to the voltage VEXTQL during the ESD test.

The second RC circuit RC2 is a circuit which controls a period T1 during which the node GIN is held at an H (high) level during the ESD test. The node GIN generates a pulse which determines a discharge time during the ESD test. The time constant of the second RC circuit RC2 is one element that determines the pulse width of the voltage of the node GIN.

The transistor Tr2 is a transistor which strongly connects the node VRC to the interconnection L2 (the voltage VSS) during the ESD test. The transistor Tr2 controls the charging start timing of the third RC circuit RC3.

The third RC circuit RC3 is a circuit which controls a period T2 during which the node GIN is held at an H level during the ESD test. By the time constant of the third RC circuit RC3, a time for lowering the node GIN to an L (low) level is set. The time constant of the third RC circuit RC3, together with the time constant of the second RC circuit RC2, is one element that determines the pulse width of the voltage of the node GIN.

The third RC circuit RC3 controls a rush current (a through current) upon power-on. This is because the third RC circuit RC3 determines the time constant of a side for turning off the transistor Tr5.

The transistor Tr3 is a transistor which strongly connects the node GIN to the interconnection L2 (the voltage VSS) upon power-on and during the normal operation. As the voltage of the node GIN becomes the voltage VSS, the transistor Tr5 is turned off, and it is possible to prevent a through current.

The transistor Tr4 is a transistor for holding the voltage of the node GIN at an H level during the ESD test. During the ESD test, the transistor Tr4 holds the voltage of the node GIN at an H level during the period T1 or the period T2.

The capacitor C4 quickly raises the voltage of the node GIN during the ESD test. Raising of the voltage is performed by capacitive coupling with the interconnection L1 (the voltage VEXTQL). The ESD test includes a human body model (HBM) and a charged device model (CDM). The current pulse used in the CDM is shorter than the current pulse used in the HBM. In the CDM, by the capacitor C4, a rise in the voltage of the node GIN by the transistor Tr4 can be more effectively complemented.

The resistor R4 weakly connects the node GIN to the interconnection L2 (the voltage VSS). Consequently, it is possible to prevent the node GIN in an initial state from becoming a floating state. As a result, it is possible to prevent a through current.

The transistor Tr5 functions as a shunt transistor (a discharge transistor) between the interconnection L1 (the voltage VEXTQL) and the interconnection L2 (the voltage VSS). During the ESD test, as the transistor Tr5 is turned on, discharge is performed from the interconnection L1 to the interconnection L2.

Next, the operation of the ESD protection circuit 100 will be described.

Figure 7:
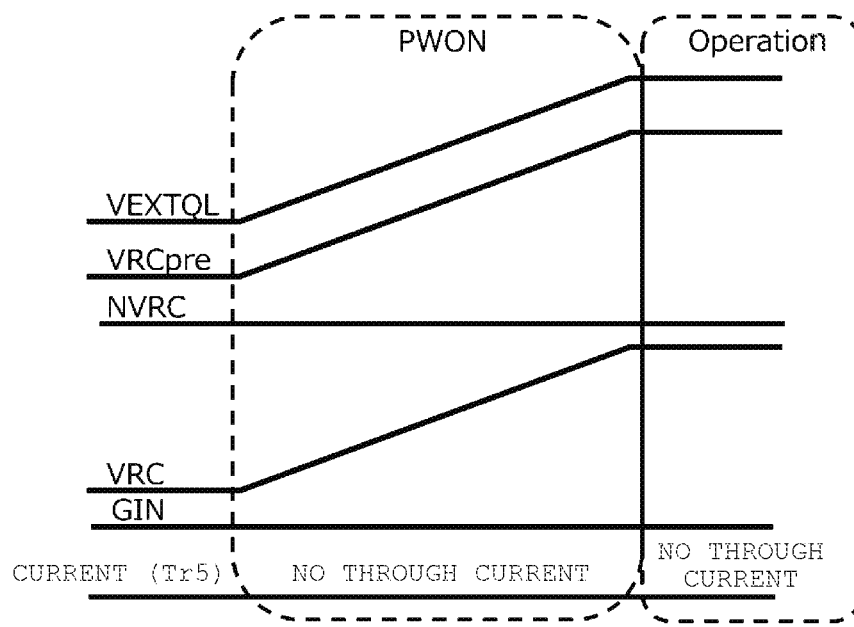
FIG. 7 is a circuit operation waveform diagram showing an example of the operation of the ESD protection circuit according to the first embodiment.

FIG. 7 is a circuit operation waveform diagram showing an example of the operation of the ESD protection circuit 100 according to the first embodiment. FIG. 7 shows the operation of the ESD protection circuit 100 upon power-on (PWON) and during a normal operation (Operation).

At a time t1, power-on (200 mV/μs) is started. By this fact, the voltage VEXTQL rises.

The time constant of the first RC circuit RC1 is set to be smaller than power source (the voltage VEXTQL) startup.

By this fact, the voltage of the node VRCpre rises at approximately the same speed as the voltage VEXTQL.

If the voltage e of the node VRCpre rises at approximately the same speed as the voltage VEXTQL, the transistor Tr1 is held in an OFF state.

The node NVRC is connected to the interconnection L2 (the voltage VSS) via the resistor R2. Accordingly, the voltage of the node NVRC is held at the voltage VSS. As a result, the transistor Tr2 is also held in an OFF state.

The voltage of the node VRC rises via the resistor R3. The time constant of the third RC circuit RC3 is also set to be smaller than power source (the voltage VEXTQL) startup. As a result, the voltage of the node VRC also rises at approximately the same speed as the voltage VEXTQL.

If the voltage of the node VRC rises, the transistor Tr3 enters an ON state. By this fact, the node GIN is strongly biased to the voltage VSS, and it is possible to prevent a through current.

The node GIN is connected to the interconnection L2 (the voltage VSS) via the resistor R4 from before power-on (the initial state). By this fact, during a power-on period, it is possible to prevent the node GIN from becoming a floating state, and it is possible to prevent a through current.

In this regard, in a general ESD protection circuit, one pair of RC circuits are used. In this case, in order to prevent a through current upon power-on, it is necessary to set the time constant of an RC circuit to be small. However, if the time constant is set to be small, a discharge time during the ESD test is shortened, and the transistor of a circuit to be protected may be destroyed by overvoltage due to residual charges by insufficient discharge. Accordingly, since the time constant cannot be set to be small, it becomes difficult to secure the margin of a through current.

On the other hand, in the first embodiment, even when the time constant of the third RC circuit RC3, which takes measures against a through current upon power-on, is set to be small, a time constant during the ESD test is not affected. By this fact, it is possible to prevent a rush current (a through current) upon power-on.

Figure 8:
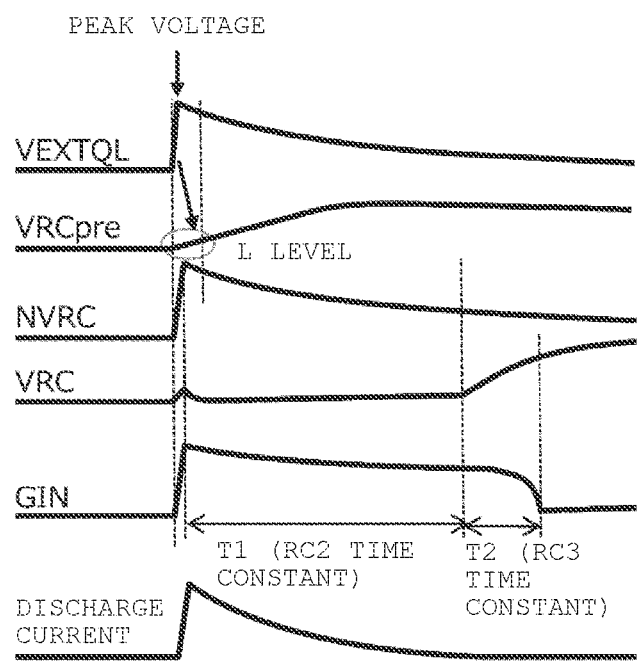
FIG. 8 is a circuit operation waveform diagram showing an example of the operation of the ESD protection circuit according to the first embodiment.

FIG. 8 is a circuit operation waveform diagram showing an example of the operation of the ESD protection circuit 100 of the first embodiment. FIG. 8 shows the operation of the ESD protection circuit 100 during the ESD test.

At a time t11, charges are injected into the power source (the voltage VEXTQL), and the voltage VEXQTL rises sharply.

Since the node VRCpre rises with the time constant of the first RC circuit RC1, a period in which the voltage of the node VRCpre is an L level occurs.

During the period in which the voltage of the node VRCpre is an L level, the transistor Tr1 is in an ON state. By this fact, charges are stored in the capacitor C2 connected to the node NVRC, and the voltage of the node NVRC rises. At this time, the voltage of the node NVRC rises to approximately the same voltage as the voltage VEXTQL.

A period during which the voltage of the node VRCpre is held at an L level is determined by the time constant of the first RC circuit RC1. The time constant of the first RC circuit RC1 may be a value that allows the voltage of the node NVRC to be the voltage VEXTQL.

At a time t12, when the voltage of the node NVRC rises, the transistor Tr2 enters an ON state. By this fact, the node VRC is strongly biased to the voltage VSS.

By the capacitor C4, the node GIN rises sharply due to coupling of the power source (the voltage VEXTQL) which rises sharply. Since the gate of the transistor Tr4 is connected to the node VRC, the transistor Tr4 enters an ON state. This helps voltage rise and H level retention of the node GIN. Since the gate of the transistor Tr5 is connected to the node GIN, the transistor Tr5 enters an ON state. By this fact, discharge is performed. By the capacitor C4 and the transistor Tr4, it is possible to sufficiently perform discharge via the transistor Tr5.

The voltage of the node NVRC falls over time due to discharge via the resistor R2.

At a time t13, the voltage of the node NVRC becomes an L level, and the transistor Tr2 is turned off. By this fact, the voltage of the node VRC rises via the resistor R3.

At a time t14, when the voltage of the node VRC becomes an H level, the transistor Tr3 is turned on. By this fact, the node GIN becomes an L level.

A period T1 is a period from the time t12 to the time t13, and is determined by the time constant of the second RC circuit RC2. A period T2 is a period from the time t13 to the time t14, and is determined by the time constant of the third RC circuit RC3.

In a general ESD protection circuit, one pair of RC circuits are used. In this case, in order to sufficiently perform discharge during the ESD test, it is necessary to set the time constant of an RC circuit to be large. However, if the time constant is set to be large, it may become impossible to control a through current upon power-on. Accordingly, since the time constant cannot be increased due to concern about occurrence of a failure upon power-on, it becomes difficult to secure the margin of a discharge time.

On the other hand, in the first embodiment, the time constant of the second RC circuit RC2 and the time constant of the third RC circuit RC3 control a discharge time, and at the same time, time constants may be respectively set between the second RC circuit RC2 and the third RC circuit RC3 which takes measures against a through current upon power-on. By this fact, it is possible to easily secure the margin of a discharge time and the margin of a through current.

The time constant of the third RC circuit RC3 is preferably set to a value smaller than the slope of power-on. Thereby, it is possible to prevent a through current upon power-on. On the other hand, during the ESD test, a discharge time is determined by the time constant of the second RC circuit RC2 in addition to the small time constant of the third RC circuit RC3. By the fact that the time constant of the second RC circuit RC2 preferably has a large value, it is possible to secure a longer discharge time. Accordingly, the time constant of the second RC circuit RC2 is preferably different from the time constant of the third RC circuit RC3, and is preferably larger than the time constant of the third RC circuit RC3. It is possible to more appropriately control a through current upon power-on, and it is also possible to more appropriately control a discharge time during the ESD test.

As described above, according to the first embodiment, the first RC circuit RC1, the second RC circuit RC2 and the third RC circuit RC3 whose time constants can be individually set are provided. Thereby, it is possible to prevent a through current upon power-on, and it is possible to appropriately perform discharge during the ESD test.

Furthermore, in the first embodiment, the nodes VRCpre and VRC are connected to the interconnection L1 (the voltage VEXTQL) via the resistors R1 and R3, respectively. The nodes NVRC and GIN are connected to the interconnection L2 (the voltage VSS) via the resistors R2 and R4, respectively. Therefore, all nodes in the ESD protection circuit 100 are connected to the power sources through the resistors. By this fact, it is possible to prevent all nodes from becoming a floating state.

If all nodes are not connected to the power sources via the resistors and a low voltage power source (the voltage VEXTQL) is adopted, an ESD protection circuit may not appropriately operate. For example, when an ESD protection circuit has an inverter which is connected between the interconnection L1 and the interconnection L2, the operating voltage of a transistor (for example, a p-type MOSFET) used in the inverter cannot be secured, and the output node of the inverter may become a floating state. That is, the internal nodes of the ESD protection circuit may become unstable. As a result, it is impossible to appropriately take measures against a through current, and a large current may flow.

On the other hand, in the first embodiment, all nodes are connected to the power sources via the resistors with high resistances. By this fact, even when a low voltage power source (the voltage VEXTQL) is adopted, it is possible to prevent the nodes VRCpre, NVRC, VRC and GIN from becoming a floating state, and it is possible to prevent a through current.

Second Embodiment

Figure 9:
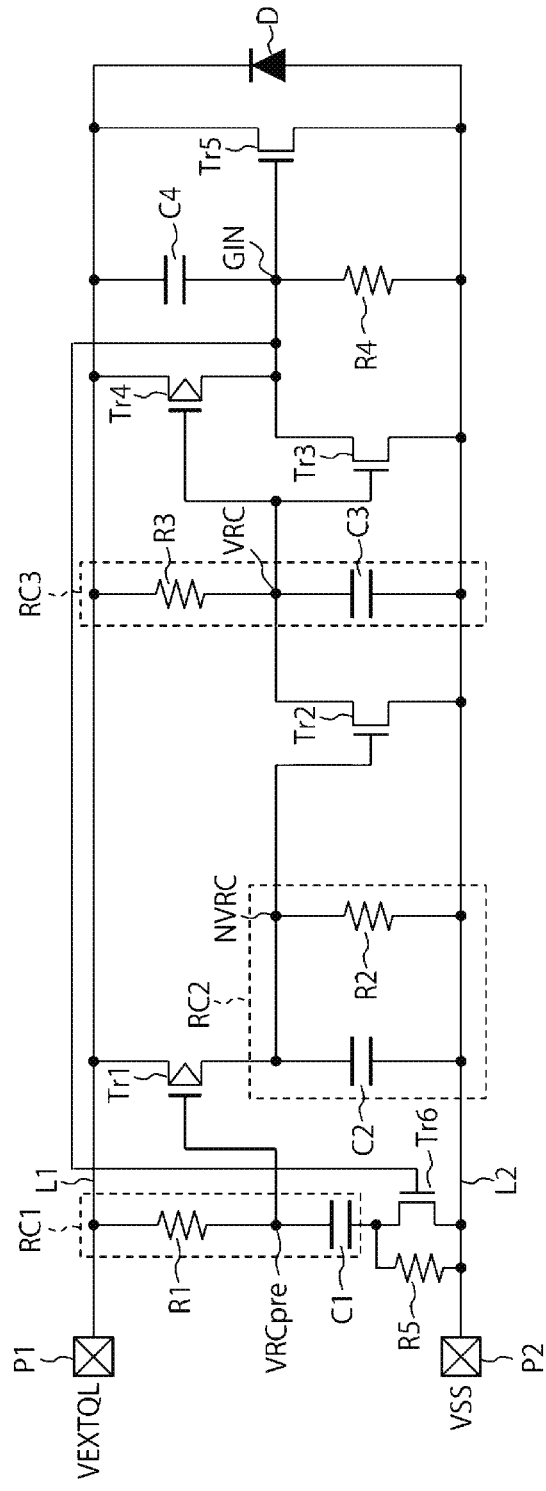
FIG. 9 is a circuit diagram showing an example of the configuration of an ESD protection circuit according to a second embodiment.

FIG. 9 is a circuit diagram showing an example of the configuration of the ESD protection circuit 100 according to a second embodiment. The second embodiment is different from the first embodiment in that a resistor R5 and a transistor Tr6 are provided.

The ESD protection circuit 100 further includes the resistor R5 and the transistor Tr6. The resistor R5 is connected between the interconnection L2 and the capacitor C1. The transistor Tr6 is connected between the interconnection L2 and the capacitor C1. The gate of the transistor Tr6 is electrically connected to the node GIN. The transistor Tr6 is, for example, an n-type MOSFET. The resistor R5 and the transistor Tr6 are connected in parallel to each other.

In the first embodiment, during a normal operation, by power source noise, that is, voltage VSS (or voltage VEXTQL) noise, and the influence of the first RC circuit RC1, the voltage of the node VRCpre may become lower than the voltage of a power source (the voltage VEXTQL). In this case, the transistor Tr1 may not enter firmly an OFF state. If the transistor Tr1 does not enter appropriately an OFF state, a leak path may be formed between the interconnection L1 (the voltage VEXTQL) and the interconnection L2 (the voltage VSS) via the transistor Tr1 and the resistor R2. If the leak path is formed during the normal operation, the voltage VEXTQL used as a power source falls.

Therefore, as the resistor R5 weakens the capacitance between the interconnection L2 and the capacitor C1, the voltage of the node VRCpre can be held at the voltage VEXTQL. Thereby, it is possible to prevent a leak path from being formed, and it is possible to prevent a through current.

In addition, due to the fact that the resistor R5 is provided, the capacitor C1 may not function appropriately during an ESD operation.

Therefore, as the transistor Tr6 enters an ON state during the ESD operation, the interconnection L2 and the capacitor C1 are connected. By this fact, it is possible to cause the node VRCpre to operate with a desired time constant.

Figure 10A:
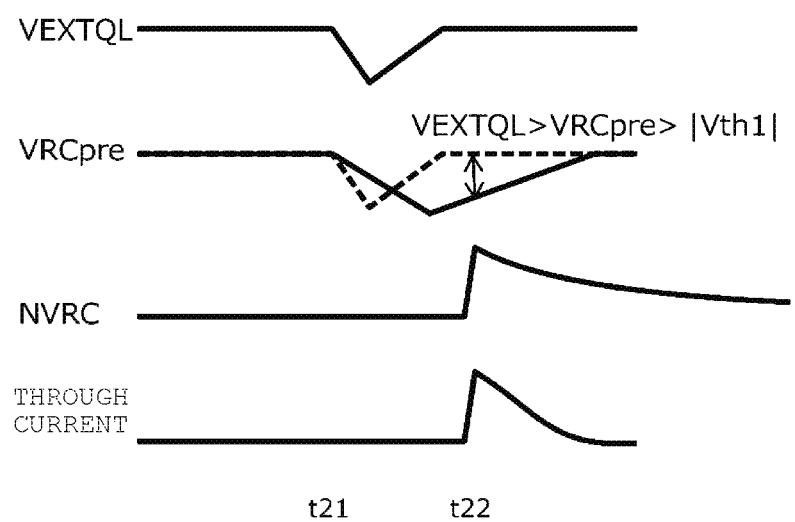
FIG. 10A is a circuit operation waveform diagram showing an example of the operation of an ESD protection circuit according to a comparative example of the second embodiment.
Figure 10B:
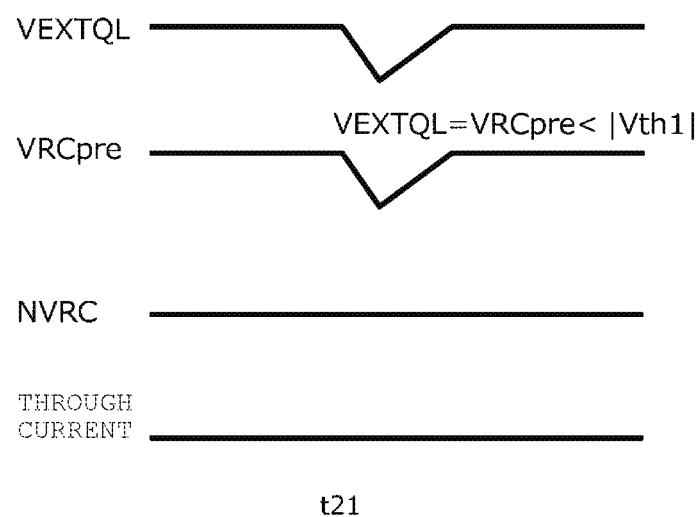
FIG. 10B is a circuit operation waveform diagram showing an example of the operation of the ESD protection circuit according to the second embodiment.

FIG. 10A is a circuit operation waveform diagram showing an example of the operation of the ESD protection circuit 100 according to a comparative example of the second embodiment. FIG. 10B is a circuit operation waveform diagram showing an example of the operation of the ESD protection circuit 100 according to the second embodiment. FIGS. 10A and 10B show the operations of the ESD protection circuit 100 during a normal operation. FIG. 10A shows a comparative example in which the resistor R5 and the transistor Tr6 are not provided. FIG. 10B shows an example in which the resistor R5 and the transistor Tr6 are provided.

First, the normal operation when the resistor R5 and the transistor Tr6 are not provided will be described. The broken line indicating the voltage of the node VRCpre shown in FIG. 10A corresponds to the voltage VEXTQL.

At a time t21, power source noise occurs, and the voltage VEXTQL and the voltage of the node VRCpre fall. Variation in the voltage of the node VRCpre is later than variation in the voltage VEXTQL by the first RC circuit RC1.

At a time t22, assuming that the threshold voltage of a transistor Tr1 is a threshold voltage Vth1, the relationship between the voltage VEXTQL, the voltage of the node VRCpre and the threshold voltage Vth1 is as follows: the voltage VEXTQL>the voltage of the node VRCpre>the absolute value |Vth1| of the threshold voltage of the transistor Tr1. As a result, the transistor Tr1 enters an ON state, and a through current which flows through the transistor Tr1 and the resistor R2 occurs. When the transistor Tr1 is a p-type MOSFET, the above relationship is also expressed as the voltage VEXTQL>the threshold voltage Vth1>the voltage of the node VRCpre.

Next, the normal operation when the resistor R5 and the transistor Tr6 are provided will be described.

At a time t21, power source noise occurs, and the voltage VEXTQL and the voltage of the node VRCpre fall. The relationship between the voltage VEXTQL, the voltage of the node VRCpre and the threshold voltage Vth1 is as follows: the voltage VEXTQL=the voltage of the node VRCpre<the absolute value |Vth1| of the threshold voltage of the transistor Tr1. That is, by providing the resistor R5, the influence of noise can be reduced. By this fact, it is possible to prevent the voltage of the node VRCpre from becoming lower than the voltage VEXTQL, and it is possible to cut off a leak path. When the transistor Tr1 is a p-type MOSFET, the above relationship is also expressed as the voltage VEXTQL=the voltage of the node VRCpre>the threshold voltage Vth1.

As in the second embodiment, the resistor R5 and the transistor Tr6 may be provided. The ESD protection circuit 100 according to the second embodiment can obtain the same effects as the first embodiment.

Third Embodiment

Figure 11:
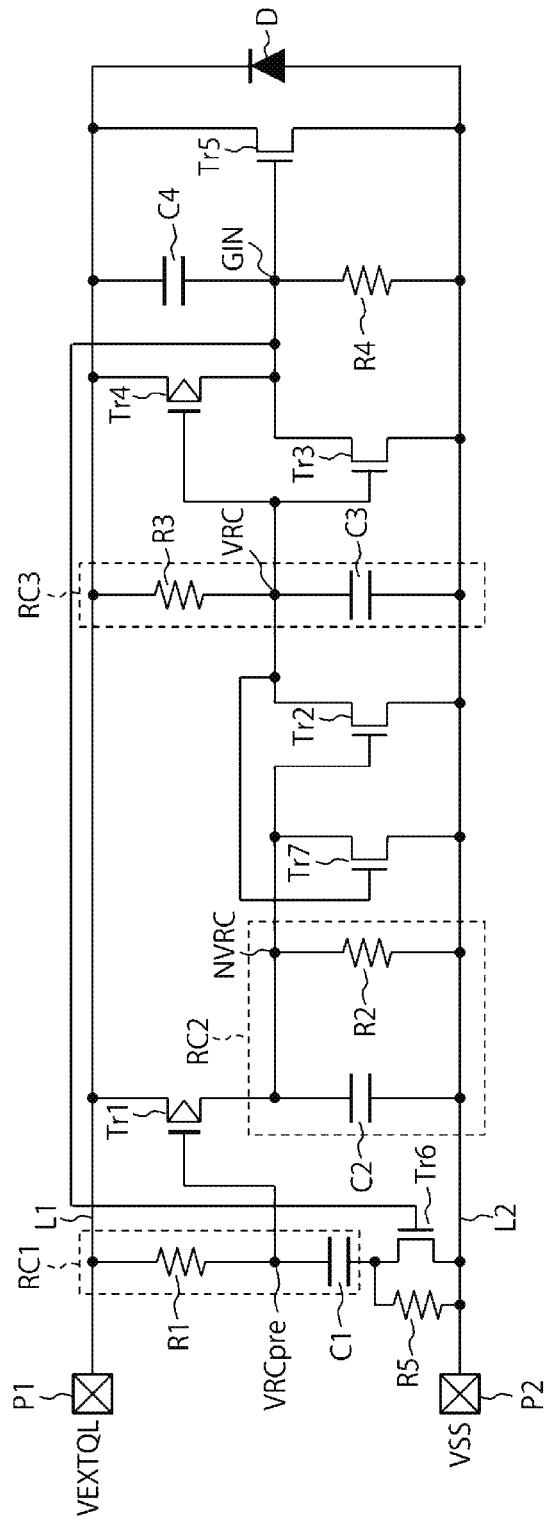
FIG. 11 is a circuit diagram showing an example of the configuration of an ESD protection circuit according to a third embodiment.

FIG. 11 is a circuit diagram showing an example of the configuration of the ESD protection circuit 100 according to a third embodiment. The third embodiment is different from the first embodiment in that a transistor Tr7 is provided.

In FIG. 11, the resistor R5 and the transistor Tr6 of the second embodiment are shown. However, the resistor R5 and the transistor Tr6 may not be provided.

The ESD protection circuit 100 further includes the transistor Tr7. The transistor Tr7 is connected between the interconnection L2 and the node NVRC. The gate of the transistor Tr7 is electrically connected to the node VRC. The transistor Tr7 is, for example, an n-type MOSFET.

In the first embodiment, during a normal operation, the voltage of the node NVRC may rise by leakage passing through the transistor Tr1 due to fluctuation in the resistor R2 and fluctuation in the threshold voltage of the transistor Tr1. In this case, the transistor Tr2 is turned on, the voltage of the node VRC becomes an L level, and the transistor Tr4 enters an ON state. As a result, the transistor Tr5 may be turned on, and a through current may occur.

Therefore, during the normal operation, the transistor Tr7 receives the voltage of the node VRC rising to an H level, and strongly biases the node NVRC to the voltage VSS. By this fact, it is possible to prevent the transistor Tr5 from being turned on, and it is possible to prevent a through current.

Further, during the ESD test, the initial voltage of the node VRC is an L level, and the voltage of the node VRC during a time set in the second RC circuit RC2 is held at the L level by the transistor Tr2. Therefore, the transistor Tr7 does not cause an operation during the ESD test to be deteriorated.

As in the third embodiment, the transistor Tr7 may be provided. The ESD protection circuit 100 according to the third embodiment may obtain the same effects as the first embodiment. The second embodiment may be combined with the ESD protection circuit 100 according to the third embodiment.

Fourth Embodiment

Figure 12:
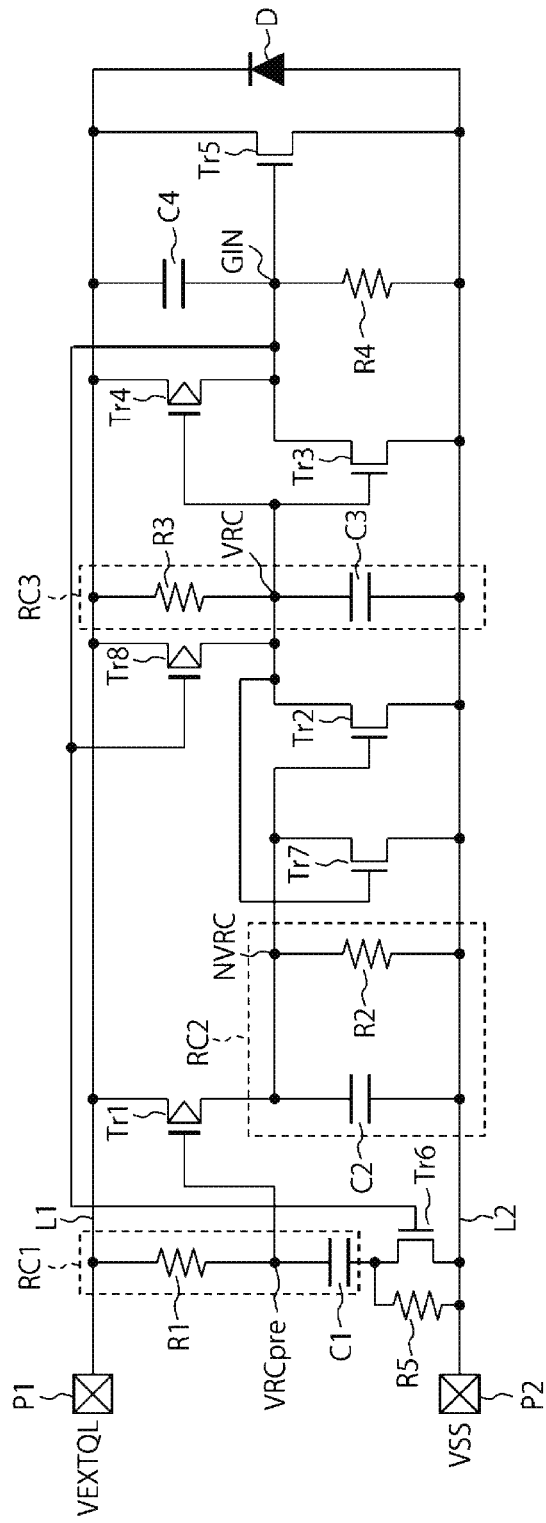
FIG. 12 is a circuit diagram showing an example of the configuration of an ESD protection circuit according to a fourth embodiment.

FIG. 12 is a circuit diagram showing an example of the configuration of the ESD protection circuit 100 according to a fourth embodiment. The fourth embodiment is different from the first embodiment in that a transistor Tr8 is provided.

In FIG. 12, the resistor R5 and the transistor Tr6 of the second embodiment and the transistor Tr7 of the third embodiment are shown. However, the resistor R5 and the transistors Tr6 and Tr7 may not be provided.

The ESD protection circuit 100 further includes the transistor Tr8. The transistor Tr8 is connected between the interconnection L1 and the node VRC. The gate of the transistor Tr8 is electrically connected to the node GIN. The transistor Tr8 is, for example, a p-type MOSFET.

In the first embodiment, during a normal operation, the voltage of the node VRC and the voltage VEXTQL are set to approximately the same level as each other. However, when the followability of the voltage of the node VRC deteriorates due to the resistance of the resistor R3, the transistor Tr4 enters an ON state. As a result, the transistor Tr5 may be turned on, and a through current may occur.

Thus, during the normal operation, the transistor Tr8 connects the interconnection L1 and the node VRC so as to reduce (eliminate) the potential difference between the voltage VEXTQL and the voltage of the node VRC. Thereby, it is possible to prevent the transistor Tr5 from being turned on, and it is possible to prevent a through current.

During the ESD test, the voltage of the node GIN is an H level, and the transistor Tr8 enters an OFF state. Therefore, the transistor Tr8 does not cause an operation during the ESD test to be deteriorated.

As in the fourth embodiment, the transistor Tr8 may be provided. The ESD protection circuit 100 according to the fourth embodiment may obtain the same effects as the first embodiment. At least one of the second embodiment and the third embodiment may be combined with the ESD protection circuit 100 according to the fourth embodiment.

Fifth Embodiment

Figure 13:
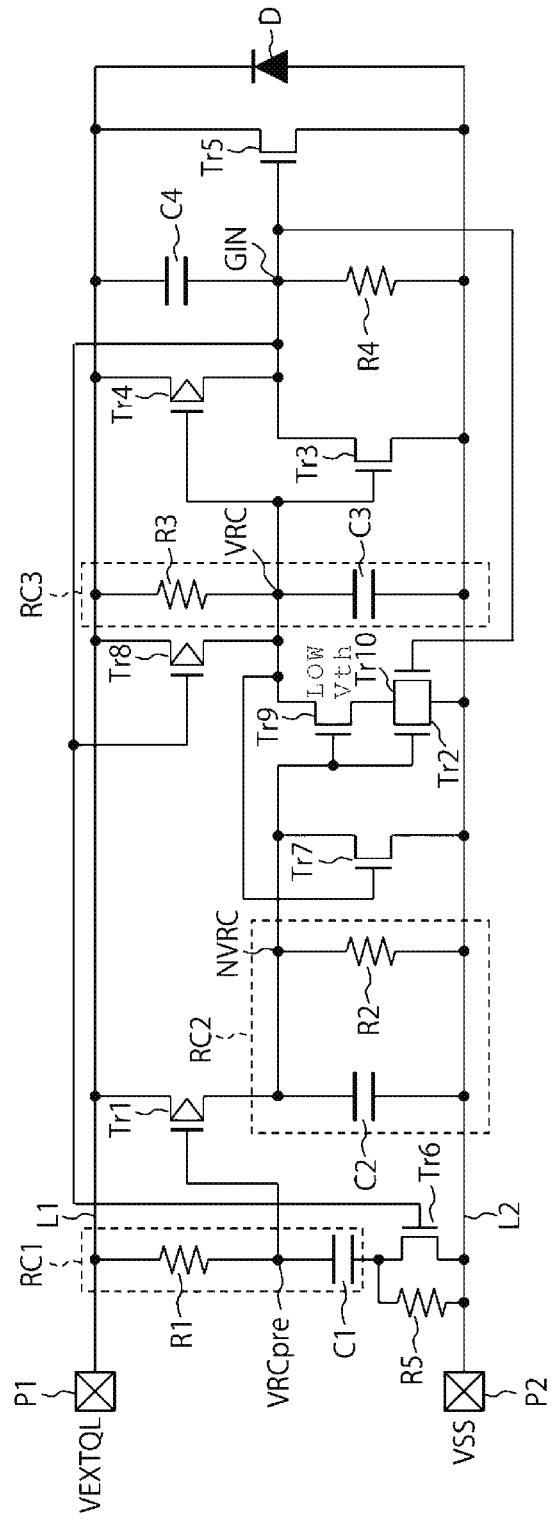
FIG. 13 is a circuit diagram showing an example of the configuration of an ESD protection circuit according to a fifth embodiment.

FIG. 13 is a circuit diagram showing an example of the configuration of the ESD protection circuit 100 according to a fifth embodiment. The fifth embodiment is different from the first embodiment in that transistors Tr9 and Tr10 are further provided.

In FIG. 13, the resistor R5 and the transistor Tr6 of the second embodiment, the transistor Tr7 of the third embodiment and the transistor Tr8 of the fourth embodiment are shown. However, the resistor R5 and the transistors Tr6, Tr7 and Tr8 may not be provided.

The ESD protection circuit 100 further includes the transistors Tr9 and Tr10.

The transistor Tr9 is connected between the node VRC and the transistor Tr2. The gate of the transistor Tr9 is electrically connected to the node NVRC. The transistor Tr9 is, for example, an n-type MOSFET.

The transistor Tr9 has a threshold voltage lower than the threshold voltage of the transistor Tr2.

The transistor Tr10 is connected between the interconnection L2 and the transistor Tr9. The gate of the transistor Tr10 is electrically connected to the node GIN. The transistor Tr10 is, for example, an n-type MOSFET. The transistors Tr2 and Tr10 are connected in parallel to each other.

In the first embodiment, if a discharge time during the ESD test is short, insufficient discharge may be caused, and violation in the withstand voltage of a thin film transistor due to residual charges may occur. For example, if the voltage VEXTQL decreases quickly due to discharge, discharge capacity becomes small. Therefore, it is necessary to make a discharge time as long as possible. By extending the time constant of the second RC circuit RC2, insufficient discharge may be resolved. However, extending the time constant leads to an increase in the area of the second RC circuit RC2, resulting in an increase in circuit size.

Therefore, the transistor Tr9, which has a threshold voltage lower than the threshold voltage of the transistor Tr2, continues to be in an ON state even after the transistor Tr2 is turned off. Furthermore, the transistor Tr10 connected in parallel to the transistor Tr2 which is in an OFF state is in an ON state. Therefore, even if the voltage of the node NVRC decreases, the node VRC may be held at the voltage VSS for a longer period of time. Not by controlling a time constant but by lengthening a time during which the voltage of the node VRC is held at an L level, a discharge pulse (a period during which the voltage of the node GIN is an H level) may be substantially extended. Thereby, without increasing the area of the second RC circuit RC2, a discharge period may be extended to prevent insufficient discharge.

The transistor Tr10 is turned on when the voltage of the node GIN becomes an H level at the start of discharge. This allows the voltage of the node VRC to be more strongly biased to the voltage VSS. As a result, a period during which the voltage of the node GIN is an H level may be further extended. Thereby, without increasing the area of the second RC circuit RC2, a discharge period may be further extended to further prevent insufficient discharge.

As in the fifth embodiment, the transistors Tr9 and Tr10 may be provided. The ESD protection circuit 100 according to the fifth embodiment can obtain the same effects as the first embodiment. At least one of the second embodiment to the fourth embodiment may be combined with the ESD protection circuit 100 according to the fifth embodiment.

Sixth Embodiment

Figure 14:
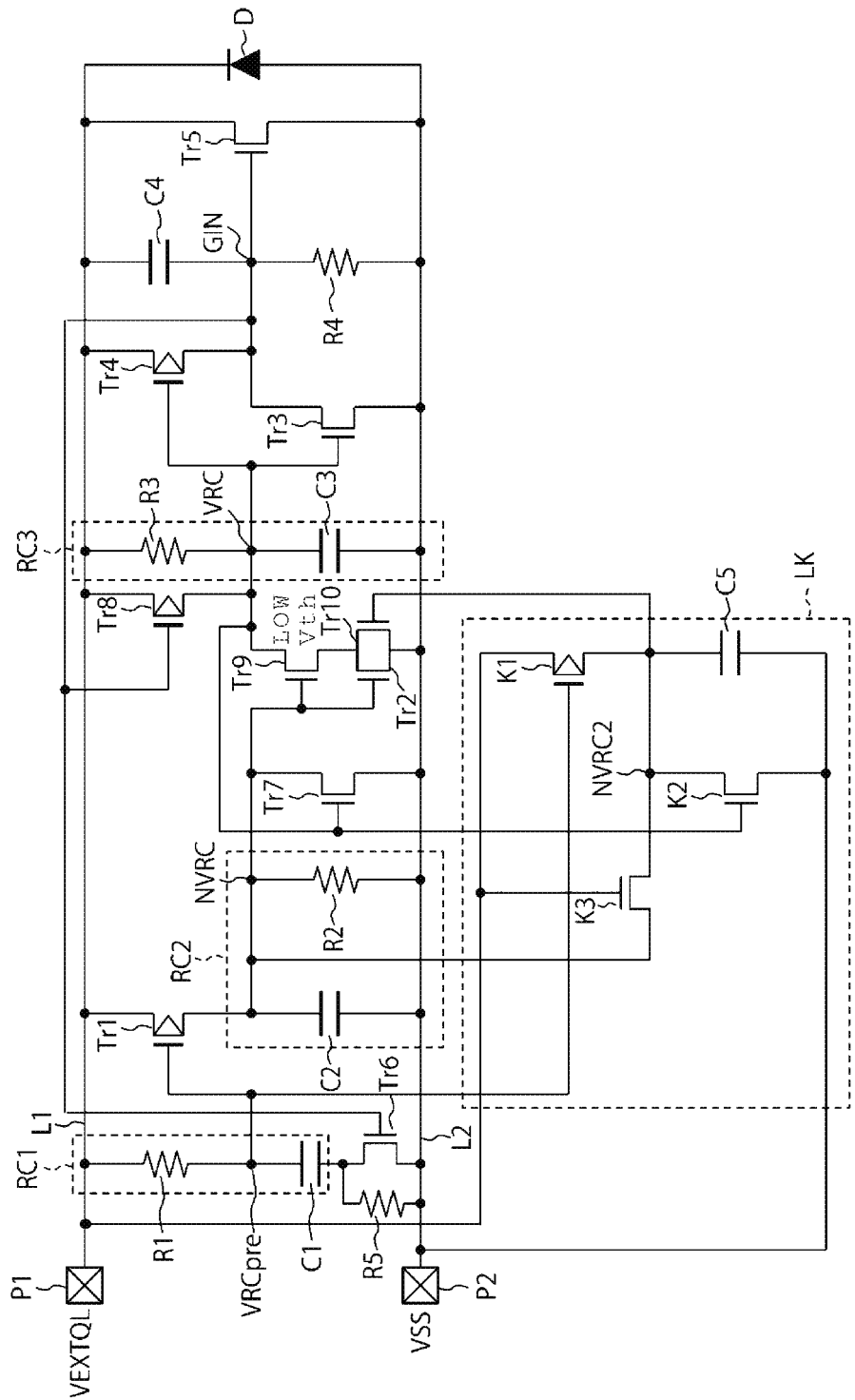
FIG. 14 is a circuit diagram showing an example of the configuration of an ESD protection circuit according to a sixth embodiment.

FIG. 14 is a circuit diagram showing an example of the configuration of the ESD protection circuit 100 according to a sixth embodiment. The sixth embodiment is different from the fifth embodiment in that the connection destination of the gate of the transistor Tr10 is changed.

In FIG. 14, the resistor R5 and the transistor Tr6 of the second embodiment, the transistor Tr7 of the third embodiment and the transistor Tr8 of the fourth embodiment are shown. However, the resistor R5 and the transistors Tr6, Tr7 and Tr8 may not be provided.

The ESD protection circuit 100 further includes a level holding circuit LK. In order to further extend a period during which the voltage of the node VRC is biased to an L level during the ESD test, the level holding circuit LK generates a signal to be input to the gate of the transistor Tr10. The voltages of the interconnections L1 and L2 and the nodes VRCpre, NVRC and VRC are input to the level holding circuit LK. A node NVRC2 of the level holding circuit LK is electrically connected to the gate of the transistor Tr10.

The level holding circuit LK includes transistors K1, K2 and K3 and a capacitor C5.

The transistor K1 is connected between the interconnection L1 and the node NVRC2. The gate of the transistor K1 is electrically connected to the node VRCpre. The transistor K1 is, for example, a p-type MOSFET.

The transistor K2 is connected between the interconnection L2 and the node NVRC2. The gate of the transistor K2 is electrically connected to the node VRC. The transistor K2 is, for example, an n-type MOSFET.

The transistor K3 is connected between the node NVRC and the node NVRC2. The gate of the transistor K3 is electrically connected to the interconnection L1. The transistor K3 is, for example, an n-type MOSFET.

The capacitor C5 is connected between the interconnection L2 and the node NVRC2. The transistor K2 and the capacitor C5 are connected in parallel to each other.

Figure 15:
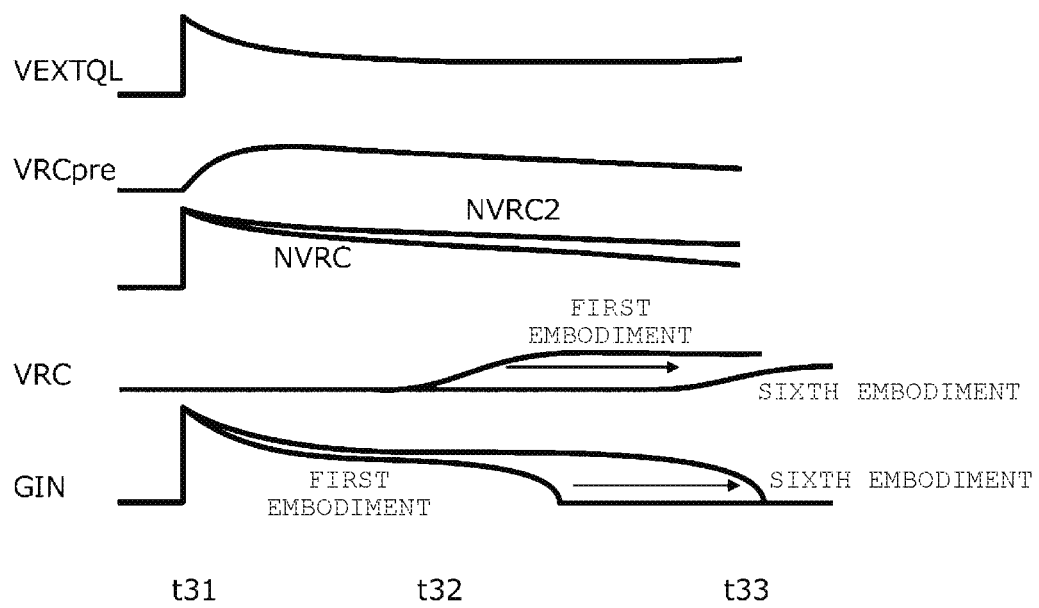
FIG. 15 is a circuit operation waveform diagram showing an example of the operation of the ESD protection circuit according to the sixth embodiment.

FIG. 15 is a circuit operation waveform diagram showing an example of the operation of the ESD protection circuit 100 according to the sixth embodiment. FIG. 15 shows the operation of the ESD protection circuit 100 during an ESD test. FIG. 15 also shows the voltages of the nodes VRC and GIN in the first embodiment.

At a time t31, the node NVRC is charged, and the node NVRC2 is also charged. Charging of the node NVRC2 is performed by charging the capacitor C5 via the transistor K1 which operates in the same manner as the transistor Tr1. The transistor K1 raises the voltage of the node NVRC2 to the same level as the voltage VEXTQL. The transistor K3 transfers the voltage of the node NVRC to the node NVRC2. Since the nodes NVRC and NVRC2 are at substantially the same voltage, the operation of the transistor K3 is not affected even when the transistor K3 is in an ON state.

The capacitor C5 is provided to hold the voltage of the node NVRC2. The capacitance of the capacitor C5 may be smaller than the capacitance of the capacitor C2 which also has the function of controlling a time constant.

Since the nodes NVRC and NVRC2 become H levels, the transistors Tr2, Tr9 and Tr10 are turned on, and the voltage of the node VRC is biased to an L level.

When the voltage VEXTQL falls, the transistor K3 is turned off. For example, as the voltage VEXTQL falls, a state of the voltage of the node NVRC2>the voltage of the node NVRC>the voltage VEXTQL or a state of the voltage of the node NVRC2>the voltage of the node NVRC=the voltage VEXTQL<the absolute value |Vth2| of the threshold voltage of the transistor K3 is achieved. The voltage of the node NVRC is charged to the voltage VEXTQL, and then, is discharged to the interconnection L2 (the voltage VSS) via the resistor R2. On the other hand, the voltage of the node NVRC2 is held to be higher than the voltage of the node NVRC.

At a time t32, the voltage of the node NVRC becomes an L level, and the transistor Tr2 is turned off. However, the transistor Tr10 biases the voltage of the node VRC to an L level. Thereby, a period during which the voltage of the node VRC is biased to an L level may be extended. The transistor Tr4 holds the voltage of the node GIN at an H level until the voltage of the node VRC rises to an H level.

At a time t33, the voltage of the node VRC becomes an H level. Therefore, the voltage of the node GIN becomes an L level, and a discharge time ends.

As shown in FIG. 15, in the sixth embodiment, compared to the first embodiment, a discharge time can be lengthened, and insufficient discharge can be prevented.

In the sixth embodiment, the voltage of the node GIN is held at an H level until a timer set by the second RC circuit RC2 and the third RC circuit RC3 is turned off, that is, until the voltage of the node VRC becomes an H level. By this fact, without being affected by the voltage VEXTQL, a discharge time can be secured, and insufficient discharge can be prevented.

During a normal operation, the transistor K2 receives the voltage of the node VRC at an H level, and biases the node NVRC2 to the voltage VSS. Therefore, the level holding circuit LK operates during the ESD test, and does not operate during the normal operation. During the normal operation, in the same manner as that the transistor Tr7 biases the node NVRC to the voltage VSS, the transistor K2 biases the node NVRC2 to the voltage VSS. Thereby, it is possible to prevent occurrence of a through current.

As in the sixth embodiment, the connection of the gate of the transistor Tr10 may be changed. The ESD protection circuit 100 according to the sixth embodiment can obtain the same effects as the fifth embodiment.

Seventh Embodiment

Figure 16:
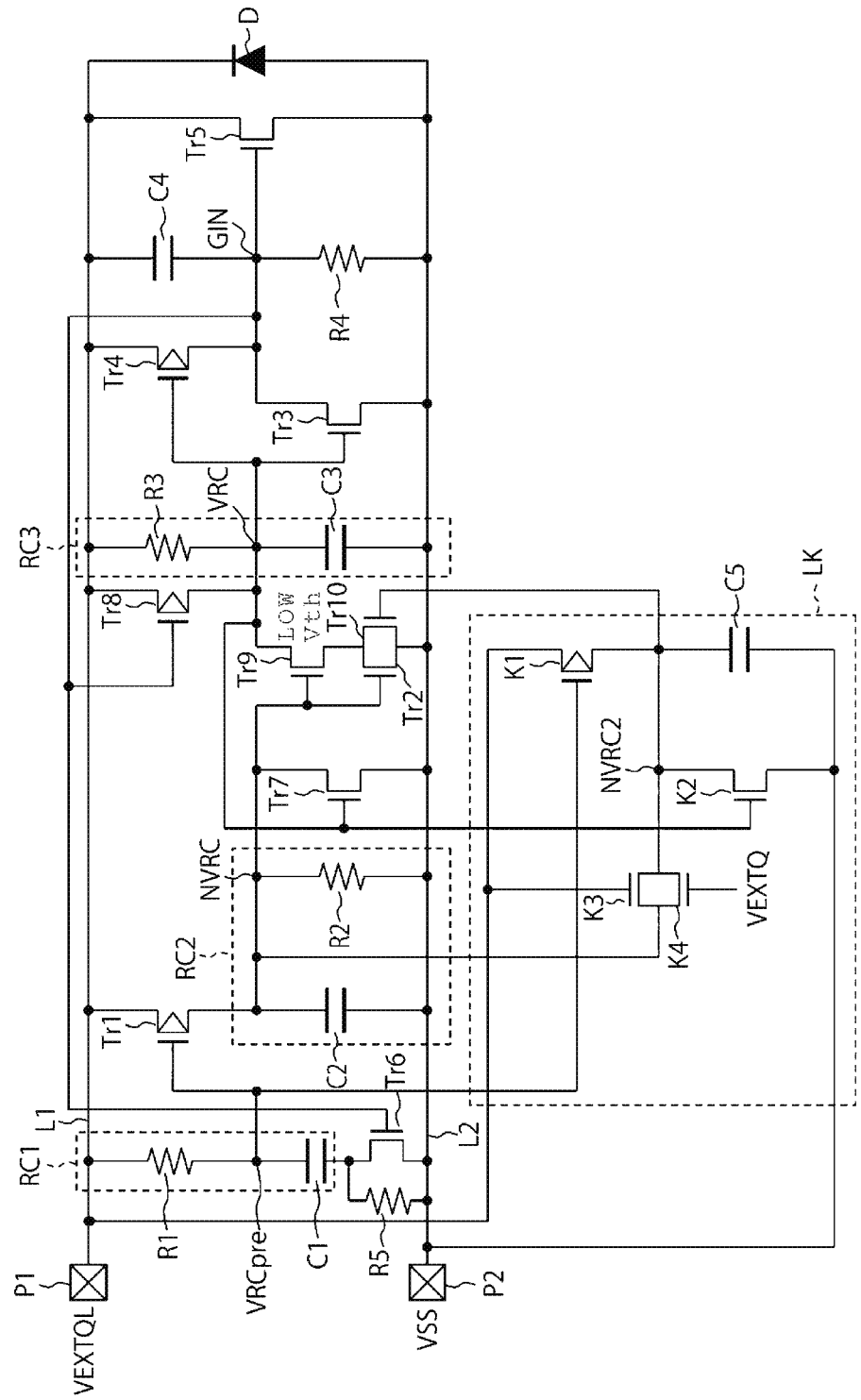
FIG. 16 is a circuit diagram showing an example of the configuration of an ESD protection circuit according to a seventh embodiment.

FIG. 16 is a circuit diagram showing an example of the configuration of the ESD protection circuit 100 according to a seventh embodiment. The seventh embodiment is different from the sixth embodiment in that the configuration of the level holding circuit LK is changed.

In FIG. 16, the resistor R5 and the transistor Tr6 of the second embodiment, the transistor Tr7 of the third embodiment and the transistor Tr8 of the fourth embodiment are shown. However, the resistor R5 and the transistors Tr6, Tr7 and Tr8 may not be provided.

The level holding circuit LK further has a transistor K4. The transistor K4 is connected between the node NVRC and the node NVRC2. The voltage VEXTQ is input to the gate of the transistor K4. The voltage VEXTQ is a power supply voltage, and is a voltage higher than the voltage VEXTQL. The voltage VEXTQ is, for example, 1.2 V. The voltage VEXTQ may be, for example, 0.6 V to 1.2 V. The transistor K4 is, for example, an n-type MOSFET. The transistors K3 and K4 are connected in parallel to each other.

In the sixth embodiment, during the normal operation, when the voltage VEXTQL further decreases, the transistor K3 may not be turned on. As a result, it may be difficult to bias the voltage of the node NVRC2 to the voltage VSS, and a through current may occur.

Therefore, the transistor K4 transfers the voltage of the node NVRC (substantially the same as the voltage VSS) to the node NVRC2 by the gate signal of the voltage VEXTQ. Thereby, at the even lower voltage VEXTQL, it is possible to prevent occurrence of a through current. By providing the transistor K4, the voltage VEXTQL can be lowered to, for example, about 0.4 V.

As in the seventh embodiment, the configuration of the level holding circuit LK may be changed. The ESD protection circuit 100 according to the seventh embodiment can obtain the same effects as the sixth embodiment.

Eighth Embodiment

Figure 17:
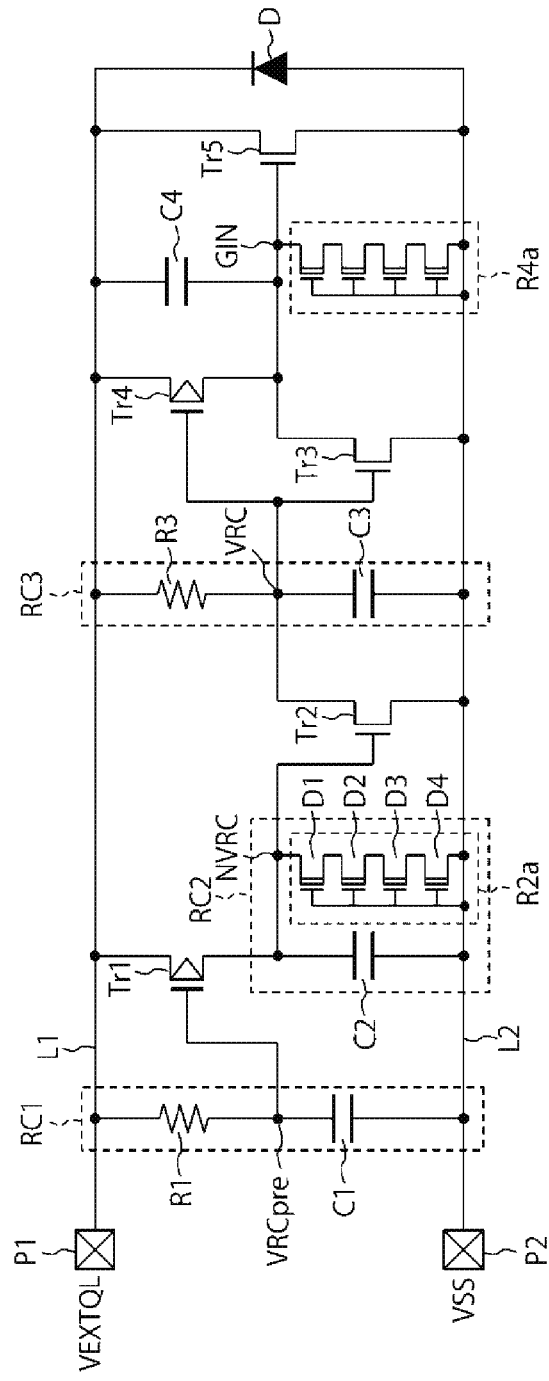
FIG. 17 is a circuit diagram showing an example of the configuration of an ESD protection circuit according to an eighth embodiment.

FIG. 17 is a circuit diagram showing an example of the configuration of the ESD protection circuit 100 according to an eighth embodiment. The eighth embodiment is different from the first embodiment in that resistors R2a and R4a are provided instead of the resistors R2 and R4 which are resistive elements.

The ESD protection circuit 100 includes the resistors R2a and R4a.

The resistor R2a has four transistors D1 to D4 which are connected in series. The four transistors D1 to D4 are, for example, depletion type (D type) n-type MOSFETs. The gates of the four transistors D1 to D4 are electrically connected to the interconnection L2 (the voltage VSS). Thereby, the four transistors D1 to D4 are used as high resistance elements with a further reduced layout area. Further, manufacturing variation of the resistor R2a can be prevented. The number of transistors D1 to D4 is not limited to four.

The configuration of the resistor R4a is, for example, the same as the configuration of the resistor R2a.

Although not shown, the resistors R1 and R3 may also include depletion type n-type MOSFETs.

As in the eighth embodiment, the resistors R2a and R4a may be provided. The ESD protection circuit 100 according to the eighth embodiment can obtain the same effects as the first embodiment. At least one of the second embodiment to the seventh embodiment may be combined with the ESD protection circuit 100 according to the eighth embodiment.

The resistor R5 described above in the second embodiment with reference to FIG. 9 may also have the same configuration as the resistors R2a and R4a.

Ninth Embodiment

Figure 18:
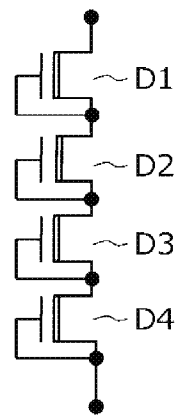
FIG. 18 is a circuit diagram showing an example of the configuration of a resistor according to a ninth embodiment.

FIG. 18 is a circuit diagram showing an example of the configuration of the resistors R2a and R4a according to a ninth embodiment. The ninth embodiment is different from the eighth embodiment in that the configuration of the resistors R2a and R4a is changed.

The gate of the transistor D1 is electrically connected to the source of the transistor D1. The gate of the transistor D2 is electrically connected to the source of the transistor D2. The gate of the transistor D3 is electrically connected to the source of the transistor D3. The gate of the transistor D4 is electrically connected to the source of the transistor D4.

As in the ninth embodiment, the configuration of the resistors R2a and R4a may be changed. The ESD protection circuit 100 according to the ninth embodiment can obtain the same effects as the eighth embodiment.

Second Configuration Example: DRAM (Dynamic Random Access Memory)

At least one of the ESD protection circuits 100 described above in the first to ninth embodiments may be used in a volatile semiconductor memory device (for example, a DRAM).

Figure 19:
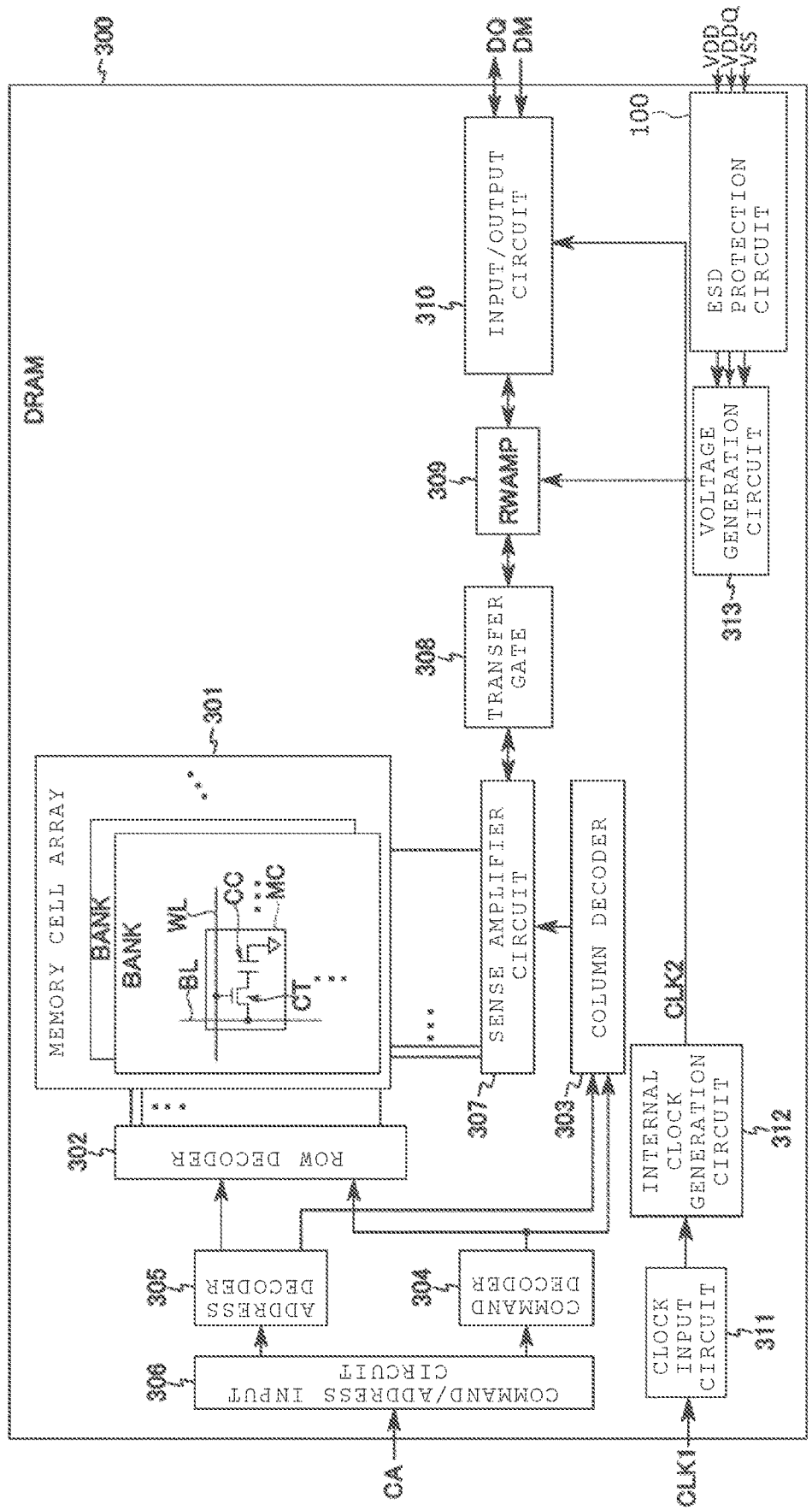
FIG. 19 is a block diagram showing an example of the configuration of a semiconductor device according to a second configuration example.

FIG. 19 is a block diagram showing an example of the configuration of a semiconductor device 300 (a DRAM) according to a second configuration example. As shown in FIG. 19, the semiconductor device 300 includes, for example, a memory cell array 301, a row decoder 302, a column decoder 303, a command decoder 304, an address decoder 305, a command/address input circuit 306, a sense amplifier circuit 307, a transfer gate 308, a read/write amplifier circuit (RWAMP) 309, an input/output circuit 310, a clock input circuit 311, an internal clock generation circuit 312, a voltage generation circuit 313, and the ESD protection circuit 100.

The memory cell array 301 includes a plurality of memory cells MC. Each memory cell MC of the semiconductor device 300 includes a cell capacitor CC and a cell transistor CT. The gate of the cell transistor CT is connected to a corresponding one of a plurality of word lines WL. One end of the current path of the cell transistor CT is connected to a bit line BL. The other end of the current path of the cell transistor CT is connected to one end of the cell capacitor CC. The other end of the cell capacitor CC is connected to a ground node. The cell capacitor CC may store an amount of charges depending on data to be stored. The cell transistor CT switches conduction/non-conduction between the memory cell MC and the bit line BL (selection/non-selection of the memory cell). The plurality of memory cells MC are arranged in a two-dimensional array shape or a three-dimensional array shape in the memory cell array 301. For example, the memory cell array 301 includes a plurality of banks. Each bank is a control unit including a plurality of memory cells MC. The plurality of banks may operate independently of each other.

The row decoder 302 controls selection/non-selection of an interconnection (for example, a word line WL) in a row direction of the memory cell array 301 based on a decoding result of address information and a decoding result of a command.

The column decoder 303 controls selection/non-selection of an interconnection (for example, a bit line BL) in a column direction of the memory cell array 301 based on a decoding result of address information and a decoding result of a command.

The command decoder 304 decodes a command received from the command/address input circuit 306. Then, the command decoder 304 sends a decoding result of the command to each of the row decoder 302 and the column decoder 303.

The address decoder 305 decodes address information received from the command/address input circuit 306. Then, the address decoder 305 sends a decoding result of the address information to each of the row decoder 302 and the column decoder 303.

The command/address input circuit 306 receives a command/address signal CA which is supplied from the outside. The command/address signal CA includes a command and address information. The command/address input circuit 306 sends the command and the address information to the command decoder 304 and the address decoder 305, respectively.

The sense amplifier circuit 307 senses and amplifies a signal from the memory cell MC during a read operation. The sense amplifier circuit 307 sends the signal from the memory cell MC as read data to the input/output circuit 310 via the transfer gate 308 and the RWAMP 309. The sense amplifier circuit 307 receives write data from the input/output circuit 310 via the transfer gate 308 and the RWAMP 309. The sense amplifier circuit 307 outputs a signal corresponding to the write data to the bit line BL.

The transfer gate 308 controls data transfer between the sense amplifier circuit 307 and the RWAMP 309.

The RWAMP 309 amplifies the level of a signal (a signal value) corresponding to read data and the level of a signal corresponding to write data.

The input/output circuit 310 functions as an interface circuit for a signal DQ transferred between the memory cell array 301 and the outside of the semiconductor device 300. The input/output circuit 310 sends write data to the memory cell array 301 at a timing synchronized with an internal clock CLK2. The input/output circuit 310 sends read data to a device external to the semiconductor device 300 at a timing synchronized with the internal clock CLK2. For example, the input/output circuit 310 receives a data mask signal DM. The input/output circuit 310 performs mask processing on the signal DQ (data) based on the data mask signal DM.

The clock input circuit 311 receives a clock CLK1 from the outside (hereinafter, referred to as an external clock). The clock input circuit 311 sends the external clock CLK1 to the internal clock generation circuit 312.

The internal clock generation circuit 312 generates the internal clock CLK2 based on the external clock CLK1.

The internal clock generation circuit 312 sends the generated internal clock CLK2 to the input/output circuit 310 and the like.

The voltage generation circuit 313 generates a plurality of voltages used in each of various operation sequences of the semiconductor device 300, by using power supply voltages from the outside (a voltage applied to a power supply node VDD, a voltage applied to a power supply node VDDQ and a voltage applied to a ground node VSS). The voltage generation circuit 313 sends the generated voltages to another circuit (for example, the RWAMP 309). The ESD protection circuit 100 shown in FIG. 19 is actually connected between power sources. The voltage applied to the power supply node VDDQ is, for example, a voltage lower than the voltage applied to the power supply node VDD, and may be supplied to the pad P1 shown in FIG. 6.

Although the second configuration example shows a case where the semiconductor device 300 is a DRAM, the present disclosure is not limited thereto. The semiconductor device 300 may be a random access memory other than a DRAM. For example, the semiconductor device 300 may be an SRAM (static RAM).

Third Configuration Example: Microcontroller

At least one of the ESD protection circuits 100 described above in the first to ninth embodiments may be used in a microcontroller.

Figure 20:
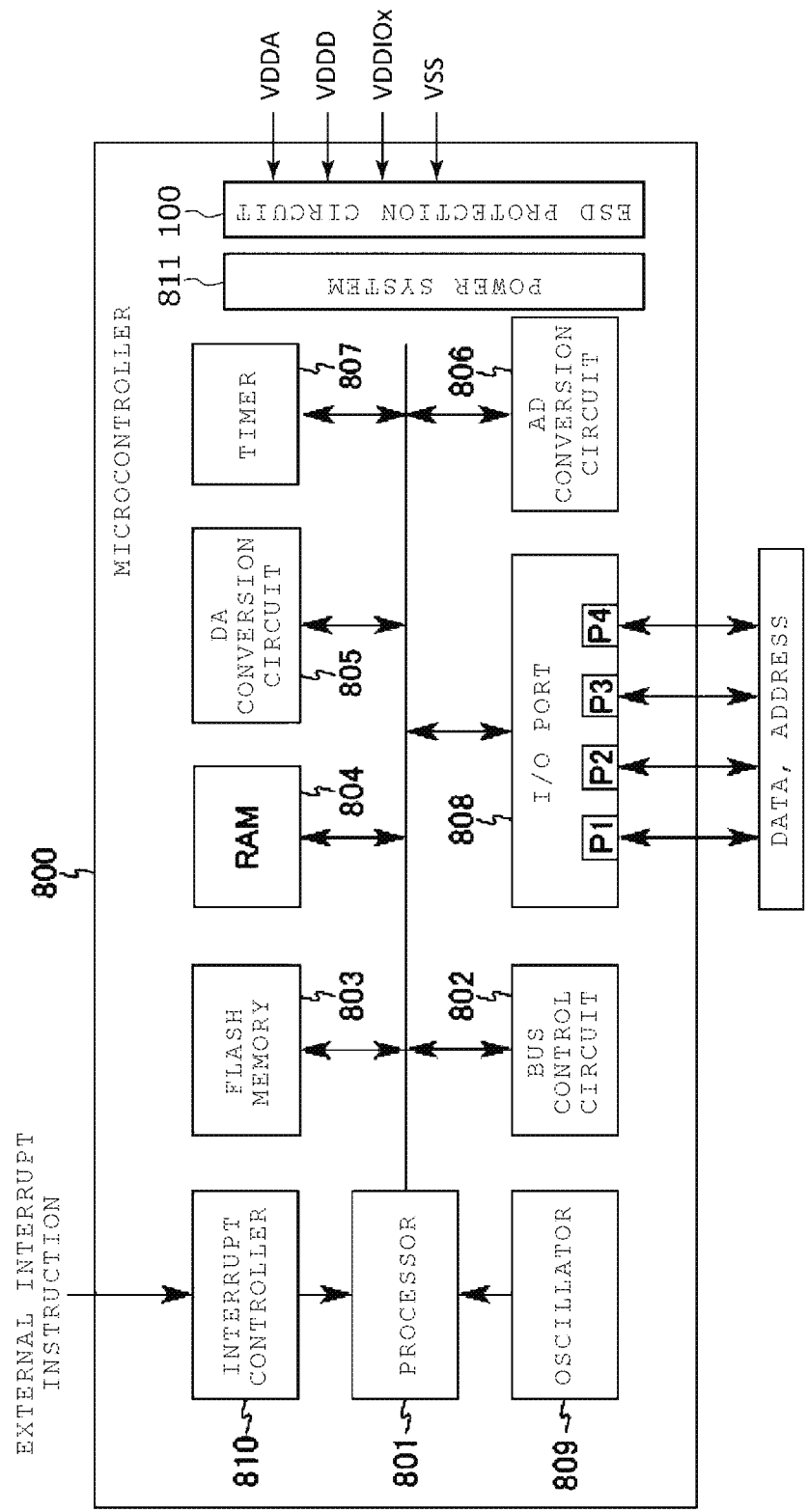
FIG. 20 is a block diagram showing an example of the configuration of a semiconductor device according to a third configuration example.

FIG. 20 is a block diagram showing an example of the configuration of a semiconductor device 800 (a microcontroller) according to a third configuration example. As shown in FIG. 20, the semiconductor device 800 includes, for example, a processor 801, a bus control circuit 802, a flash memory 803, a RAM 804, a DA conversion circuit 805, an AD conversion circuit 806, a timer 807, an input/output (I/O) port 808, an oscillator 809, an interrupt controller 810, and a power supply system 811. The bus of the semiconductor device 800 is connected to the processor 801, the bus control circuit 802, the flash memory 803, the RAM 804, the DA conversion circuit 805, the AD conversion circuit 806, the timer 807 and the input/output port 808. The bus of the semiconductor device 800 is a signal and data transfer path in the semiconductor device 800.

The processor 801 executes various processing in the semiconductor device 800. The processor 801 performs various processing on supplied data. The processor 801 is, for example, a CPU.

The bus control circuit 802 controls the bus of the semiconductor device 800. The bus control circuit 802 may be provided in the processor 801.

The flash memory 803 is a storage device which may store data in a nonvolatile manner. The flash memory 803 is, for example, a NOR type flash memory. The flash memory 803 may be a NAND type flash memory.

The RAM 804 is a storage device which temporarily stores data. The RAM 804 is, for example, a random access memory such as an SRAM or a DRAM.

The DA conversion circuit 805 converts a digital signal (a digital value) into an analog signal (an analog value).

The AD conversion circuit 806 converts an analog signal into a digital signal.

The timer 807 manages a time (an operation timing) within the semiconductor device 800.

The input/output port 808 functions as an interface circuit in the semiconductor device 800. The input/output port 808 includes, for example, four ports P1, P2, P3 and P4. The number of ports in the input/output port 808 may be three or less or may be five or more. The input/output port 808 receives a signal including data, an address, and the like from outside the semiconductor device 800 via each of the ports P1, P2, P3 and P4. The input/output port 808 sends a signal including data and the like to the outside of the semiconductor device 800 via each of the ports P1, P2, P3 and P4. The input/output port 808 is based on, for example, the GPIO (general purpose input/output) standard, the USART (universal synchronous/asynchronous receiver transmitter) standard or the I2C (inter-integrated circuit) standard.

The oscillator 809 outputs a clock signal as a synchronization signal to the processor 801. The clock signal has a certain period (number of clocks). By this fact, the processor 801 performs various processing at a timing synchronized with the clock signal. The period of the clock signal is, for example, 4 MHZ, 8 MHZ, 12 MHz or 24 MHz.

The interrupt controller 810 receives an external interrupt instruction. For example, the interrupt controller 810 has a register for managing the status of an interrupt request. The interrupt controller 810 sends various interrupt requests to the processor 801 based on the received external interrupt instruction. In response to the interrupt request, the processor 801 temporarily interrupts processing under execution, and executes processing of the interrupt request. After completion of processing of the interrupt request, the processor 801 resumes processing under interruption.

The power supply system 811 generates a plurality of voltages used for each of various operation sequences of the semiconductor device 800 by using power supply voltages from the outside (voltages VDDA, VDDD and VDDIOx and a ground voltage VSS), and sends the generated voltages to other circuits. The ESD protection circuit 100 shown in FIG. 20 is actually connected between power sources. The voltages VDDD and VDDIOx are, for example, voltages equal to or lower than the voltage VDDA, and may be supplied to the pad P1 shown in FIG. 6.

In the semiconductor device 800 according to the third configuration example of the fifth embodiment, a microcontroller 1C of the present embodiment may be a system-on-chip (SoC), a system-in-package (SIP) or a system-onpackage (SoP). The semiconductor device 800 is used, for example, for an embedded system. The semiconductor device 800 may be used in, for example, in-vehicle devices, home appliances, computers, industrial machines, railway vehicles, aircrafts, ships, and the like.

Further, the semiconductor device 800 may be classified based on bus width, memory structure, instruction set, and the like. The bus width indicates the size of a data bus. For example, the semiconductor device 800 is classified into an 8-bit microcontroller, a 16-bit microcontroller or a 32-bit microcontroller based on the bus width. The semiconductor device 800 may achieve better performance with a high bus width.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A semiconductor device comprising:
   a protection circuit electrically connected to a first interconnection and a second interconnection, a first voltage and a second voltage supplied to the first interconnection and the second interconnection, respectively,
   wherein the protection circuit includes:
   a first resistor connected between the first interconnection and a first node;
   a first capacitor connected between the second interconnection and the first node;
   a second resistor connected between the second interconnection and a second node;
   a second capacitor connected between the second interconnection and the second node, the second capacitor being connected in parallel to the second resistor;
   a third resistor connected between the first interconnection and a third node; and
   a third capacitor connected between the second interconnection and the third node.

2. The semiconductor device according to claim 1, wherein
   the second resistor and the second capacitor form a second RC circuit,
   the third resistor and the third capacitor form a third RC circuit, and
   the second RC circuit has a time constant larger than a time constant of the third RC circuit.

3. The semiconductor device according to claim 1, wherein the first resistor and the first capacitor form a first RC circuit, the first RC circuit having a time constant that is lower than a startup speed of the first voltage upon power-on.

4. The semiconductor device according to claim 1, wherein
   the protection circuit further includes a first transistor with a gate electrically connected to the second node, and the first transistor is connected between the second interconnection and the third node, and
   the first transistor is an n-type MOSFET.

5. The semiconductor device according to claim 1, wherein the protection circuit further includes a second transistor with a gate electrically connected to a fourth node, and the second transistor is connected between the first interconnection and the second interconnection.

6. The semiconductor device according to claim 1, further comprising:
   a fourth resistor connected between the second interconnection and a fourth node.

7. The semiconductor device according to claim 1, wherein the protection circuit further includes a fourth capacitor connected between the first interconnection and a fourth node.

8. The semiconductor device according to claim 1, wherein the protection circuit further includes:
   a fifth resistor connected between the second interconnection and the first capacitor; and
   a third transistor with a gate electrically connected to a fourth node, and the third transistor is connected between the second interconnection and the first capacitor and connected in parallel to the fifth resistor.

9. The semiconductor device according to claim 1, wherein the protection circuit further includes a fourth transistor with a gate electrically connected to the third node, and the fourth transistor is connected between the second interconnection and the second node.

10. The semiconductor device according to claim 1, wherein the protection circuit further includes a fifth transistor with a gate electrically connected to a fourth node, and the fifth transistor is connected between the first interconnection and the third node.

11. The semiconductor device according to claim 1, wherein the protection circuit further includes:
    a sixth transistor with a gate electrically connected to the second node, and the sixth transistor is connected between the second interconnection and the third node;
    a seventh transistor with a gate electrically connected to the second node, and the seventh transistor is connected between the third node and the sixth transistor; and
    an eighth transistor with a gate electrically connected to a fourth node, and the eighth transistor is connected between the second interconnection and the seventh transistor and connected in parallel to the sixth transistor,
    wherein a threshold voltage of the seventh transistor is lower than a threshold voltage of the sixth transistor.

12. The semiconductor device according to claim 1, wherein the protection circuit further includes:
    a ninth transistor with a gate electrically connected to the second node, and the ninth transistor is connected between the second interconnection and the third node;
    a tenth transistor with a gate electrically connected to a fifth node, is the tenth transistor is connected between the second interconnection and the third node and connected in parallel to the ninth transistor;
    an eleventh transistor with a gate electrically connected to the first node, and the eleventh transistor is connected between the first interconnection and the fifth node; and
    a twelfth transistor with a gate electrically connected to the first interconnection, and the twelfth transistor is connected between the second node and the fifth node.

13. The semiconductor device according to claim 12, wherein the protection circuit further has:
    a thirteenth transistor with a gate configured to receive a third voltage higher than the first voltage, and the thirteenth transistor is connected between the second node and the fifth node and connected in parallel to the twelfth transistor.

14. The semiconductor device according to claim 1, wherein the second resistor includes a plurality of depletion type n-type MOSFETs connected in series.

15. The semiconductor device according to claim 1, wherein
the first voltage is about 0.4 V to 0.6 V, and
the second voltage is a ground voltage.

16. The semiconductor device according to claim 1, wherein
the first voltage is about 0.6 V to 1.2 V, and
the second voltage is a ground voltage.

17. The semiconductor device according to claim 1, wherein the first voltage is higher than the second voltage.

18. The semiconductor device according to claim 1, further comprising:
a fourteenth transistor with a gate electrically connected to the first node, and the fourteenth transistor is connected between the first interconnection and the second node.

19. The semiconductor device according to claim 1, further comprising:
a fifteenth transistor with a gate electrically connected to the third node, and the fifteenth transistor is connected between the second interconnection and a fourth node located; and a sixteenth transistor with a gate electrically connected to the third node, and the sixteenth transistor is connected between the first interconnection and the fourth node.

20. The semiconductor device according to claim 1, further comprising:
a diode having a cathode electrically connected to the first interconnection and an anode electrically connected to the second interconnection.

* * * * *